United States Patent
Stevens et al.

(10) Patent No.: US 11,382,143 B1
(45) Date of Patent: Jul. 5, 2022

(54) NETWORK USING BEACONLESS ALLOCATION OF SLOTS

(71) Applicant: Rockwell Collins, Inc., Cedar Rapids, IA (US)

(72) Inventors: James A. Stevens, Lucas, TX (US); T J T. Kwon, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 72 days.

(21) Appl. No.: 16/909,413

(22) Filed: Jun. 23, 2020

(51) Int. Cl.
| | |
|---|---|
| H04L 67/12 | (2022.01) |
| H04W 74/08 | (2009.01) |
| H04W 72/04 | (2009.01) |
| H04W 76/15 | (2018.01) |
| H04W 84/20 | (2009.01) |

(52) U.S. Cl.
CPC ... *H04W 74/0866* (2013.01); *H04W 72/0446* (2013.01); *H04W 76/15* (2018.02); *H04W 84/20* (2013.01)

(58) Field of Classification Search
None
See application file for complete search history.

(56) References Cited

U.S. PATENT DOCUMENTS

| | | | |
|---|---|---|---|
| 4,639,937 | A | 1/1987 | McRae et al. |
| 8,175,109 | B2 | 5/2012 | Nogueira-Nine et al. |
| 10,104,596 | B2 | 10/2018 | Purohit |
| 16,537,824 | | 8/2019 | Kwon et al. |
| 10,609,622 | B2 | 3/2020 | Bader et al. |
| 2006/0133408 | A1* | 6/2006 | Nogueira-Nine .......... H04W 52/0219 370/447 |
| 2009/0103501 | A1* | 4/2009 | Farrag ................ H04W 74/02 370/337 |
| 2012/0155279 | A1* | 6/2012 | Ho ................ H04W 74/08 370/241 |
| 2017/0156101 | A1* | 6/2017 | Takahashi ............. H04L 5/0053 |
| 2017/0208633 | A1* | 7/2017 | Terazaki .............. H04W 74/08 |
| 2019/0014526 | A1* | 1/2019 | Bader .................. H04L 69/22 |
| 2019/0132839 | A1* | 5/2019 | Li ....................... H04W 12/08 |
| 2021/0127316 | A1* | 4/2021 | Di Taranto .......... H04W 40/023 |

FOREIGN PATENT DOCUMENTS

EP    2683200 A1    1/2014

OTHER PUBLICATIONS

U.S. Appl. No. 16/367,483, filed Mar. 28, 2019, Kwon et al.
U.S. Appl. No. 16/369,398, filed Mar. 29, 2019, Kwon et al.
U.S. Appl. No. 16/537,824, filed Aug. 12, 2019, Kwon et al.
Heissenbuttel, M. et al., "Blr: Beaconless routing algorithm for mobile ad-hoc networks," Elseviers Computer Communications Journal (Special Issue), vol. 27, 2003.
Kim, Kyungtae et al., "Beacon-Less Operation and Idle Ping Slot Control for Low Power Communication in LoRaWAN", KIPS Tr. Comp. and Comm. Sys., vol. 6, No. 5, pp. 231-238, Feb. 13, 2017.

* cited by examiner

*Primary Examiner* — Brandon M Renner
(74) *Attorney, Agent, or Firm* — Suiter Swantz pc llo

(57) ABSTRACT

A multi-node communication network and a method. The multi-node communication network may include a plurality of nodes, wherein the multi-node communication network may be configured to use beaconless allocation of slots to reserve transmission resources. The method may include: providing a multi-node communication network comprising a plurality of nodes; and using beaconless allocation of slots to reserve transmission resources for the multi-node communication network.

8 Claims, 18 Drawing Sheets

NETWORK USING BEACONLESS ALLOCATION OF SLOTS

CROSS-REFERENCE TO RELATED APPLICATIONS

The present application is related to U.S. patent application Ser. No. 16/537,824, filed Aug. 12, 2019, which is incorporated by reference in its entirety.

BACKGROUND

Mobile ad-hoc networks (MANETs) are known in the art as quickly deployable, self-configuring wireless networks with no pre-defined network topology. Each communication node within a MANET is presumed to be able to move freely. Additionally, each communication node within a MANET may be required to forward (relay) data packet traffic. Data packet routing and delivery within a MANET may depend on a number of factors including, but not limited to, the number of communication nodes within the network, communication node proximity and mobility, power requirements, network bandwidth, user traffic requirements, timing requirements, and the like.

Currently, networks use beacons to request and grant requested additional resources. For example, beacons may be used for discovery of neighbors and routing, for network join and departure control, for time synchronization, for channel access control including allocating contention free slots and requesting a contention channel, and for exchange of link metrics for adaptive transmission control, such as transmit power, FEC, etc. However, disadvantages of beacons include that beacons are not as frequent as transmission cycles and that resource allocation cannot be instantaneous.

SUMMARY

In one aspect, embodiments of the inventive concepts disclosed herein are directed to a multi-node communication network. The multi-node communication network may include a plurality of nodes, wherein the multi-node communication network may be configured to use beaconless allocation of slots to reserve transmission resources.

In a further aspect, embodiments of the inventive concepts disclosed herein are directed to method. The method may include: providing a multi-node communication network comprising a plurality of nodes; and using beaconless allocation of slots to reserve transmission resources for the multi-node communication network.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
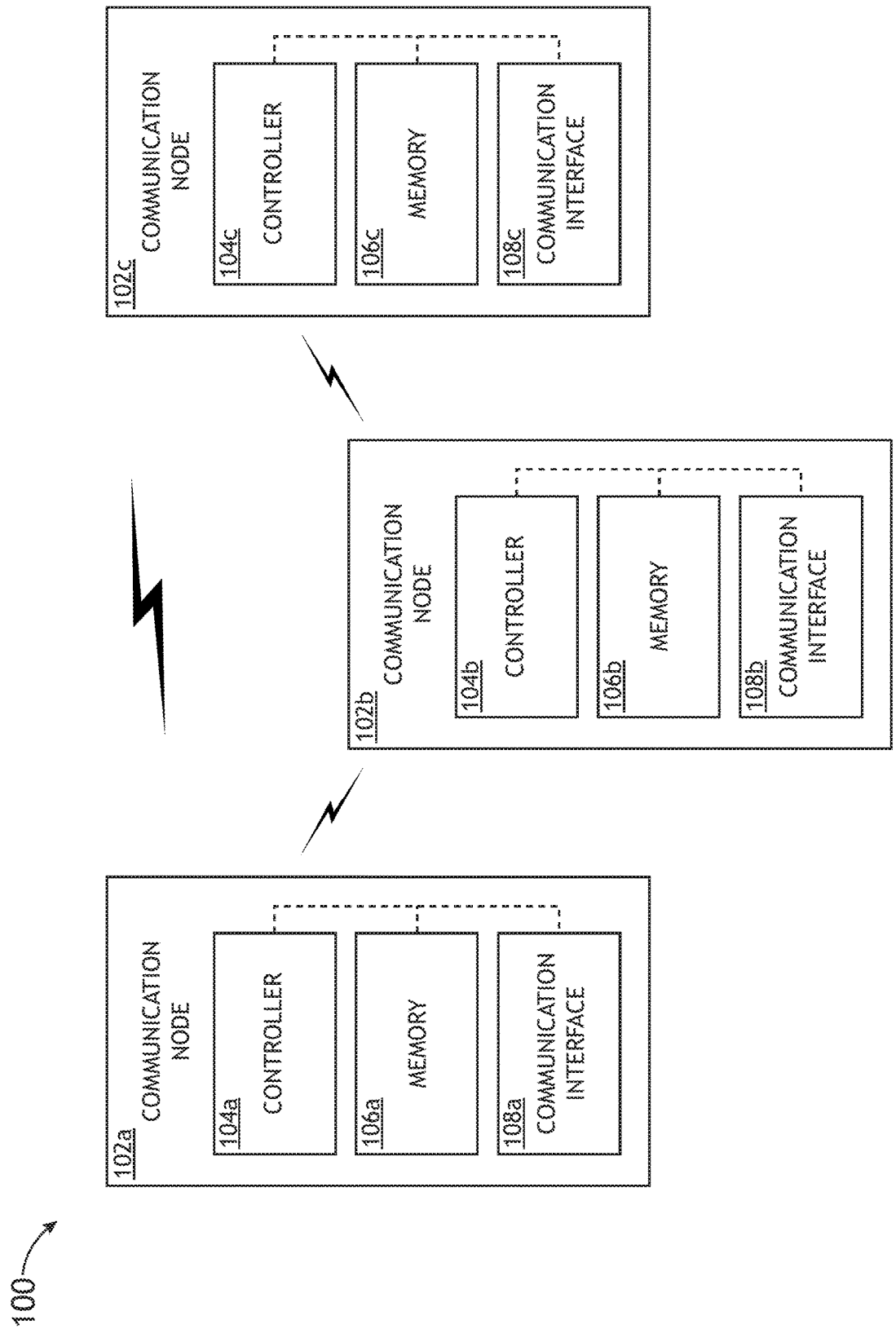
FIG. 1 illustrates a multi-node communication network, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Mobile ad-hoc networks (MANETs) are known in the art as quickly deployable, self-configuring wireless networks with no pre-defined network topology. Each communication node within a MANET is presumed to be able to move freely. Additionally, each communication node within a MANET may be required to forward (relay) data packet traffic. Data packet routing and delivery within a MANET may depend on a number of factors including, but not limited to, the number of communication nodes within the network, communication node proximity and mobility, power requirements, network bandwidth, user traffic requirements, timing requirements, and the like.

Currently, packet flooding is one of the only techniques which may be used to deliver a data packet to a particular destination without knowing the route or network topology. Packet flooding typically involves transmitting short "route-request" packets and/or "topology control (advertisement)" messages throughout the network in order to discover network topology and/or advertise local link status throughout the network. The link status is discovered by exchanging "Hello" messages. However, route request packets and "hello" messages are typically much shorter than data packets whose discovered route or link will be used in subsequent data transmissions. Accordingly, routes discovered using shorter route request packets and "hello" messages may not be ideal for subsequent data packet transmissions due to increased packet error rates.

Moreover, due to changing environmental conditions and mobile communication nodes within a MANET, channel quality, channel congestion, and network topology may constantly change within a MANET, causing discovered routes to quickly become stale or otherwise ill-suited for data transmission. Stale and/or failed routes require additional route discovery and/or route recovery time, which may not be tolerated in some implementations of the MANET.

Accordingly, some embodiments of the present disclosure are directed to a system and method which cure one or more of the shortfalls of the previous approaches identified above. Some embodiments of the present disclosure are directed to a system and method of transmitting data packets through a multi-node communication network via packet flooding procedures and discovered routes. In particular, embodiments of the present disclosure are directed to transmitting data packets via a "flooding-to-routing" communication technique. Some embodiments of the present disclosure are directed to a system and method for identifying routes within a multi-node communication network without the use of route request packets or "hello" messages. Some embodiments of the present disclosure are directed to a system and method utilizing packet flooding procedures to recover routes within a multi-node communication network.

In some embodiments, it is contemplated herein that transmitting data packets of a data transmission, in lieu of route-request packets or "hello" messages, may ensure discovered routes are suitable and/or appropriate for the data transmission and may reduce a route failure rate within the multi-node communication network. Moreover, the transmission of data packets in lieu of route request packets may enable more efficient network topology learning. It is further contemplated herein that the system and method of the present disclosure may reduce the time required for initial route discovery as well as route recovery, enabling faster and more efficient communication within a multi-node communication network.

In some embodiments, a multi-node communication network may be configured to use beaconless allocation of slots to reserve transmission resources.

FIG. 1 illustrates a multi-node communication network 100, in accordance with one or more embodiments of the present disclosure. In embodiments, the multi-node communication network 100 may include a plurality of communication nodes 102. For example, the multi-node communication network 100 may include a first communication node 102a, a second communication node 102b, and a third communication node 102c.

The multi-node communication network 100 may include any multi-node communication network known in the art. For example, the multi-node communication network 100 may include a mobile ad-hoc network (MANET) in which each communication node 102 within the multi-node communication network is able to move freely and independently. Similarly, the one or more communication nodes 102 may include any communication node known in the art which may be communicatively coupled. In this regard, the one or more communication nodes 102 may include any communication node known in the art for transmitting/transceiving data packets. For example, the one or more communication nodes 102 may include, but are not limited to, radios, mobile phones, smart phones, tablets, smart watches, laptops, and the like.

Each communication node 102 of the one or more communication nodes 102a, 102b, 102c may include, but is not limited to, a respective controller 104 (e.g., controller 104a, 104b, 104c, etc.), memory 106 (e.g., memory 106a, 106b, 106c, etc.), and communication interface 108 (e.g., communication interface 108a, 108b, 108c, etc.).

The controller 104 provides processing functionality for at least the communication node 102 and can include any number of processors, micro-controllers, circuitry, field programmable gate array (FPGA) or other processing systems, and resident or external memory for storing data, executable code, and other information accessed or generated by the communication node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communication node 102/controller 104, such as software programs and/or code segments, or other data to instruct the controller 104, and possibly other components of the communication node 102, to perform the functionality described herein. Thus, the memory 106 can store data, such as a program of instructions for operating the communication node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of their communication node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communication node 102 and the controller 104. It should be noted that while the communication interface 108 is described as a component of the communication node 102, one or more components of the communication interface 108 can be implemented as external components communicatively coupled to the communication node 102 via a wired and/or wireless connection. The communication node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communication node 102 may be configured to communicatively couple to additional communication interfaces 108 of additional communication nodes 102 of the multi-node communication network 100 using any wireless communication techniques known in the art including, but not limited to, GSM, GPRS, CDMA, EV-DO, EDGE, WiMAX, 3G, 4G, 4G LTE, 5G, WiFi protocols, radio frequency (RF), LoRa, and the like.

In embodiments, the controller 104 of a communication node 102 is configured to carry out and/or cause to be carried out any or all of the steps and functions of the present disclosure. The controller 104 may be configured to: receive a first data packet, via the communication interface 108, transmitted from a source communication node to a destination communication node; transmit the first data packet, via the communication interface 108, to one or more relay nodes via a packet flooding procedure; receive a first route response acknowledgment, via the communication interface 108, transmitted from the destination communication node to the source communication node along a discovered route; relay an additional data packet transmitted from the source communication node to the destination communication node along the discovered route; determine a route failure of the transmitted additional data packet; re-transmit, via the communication interface 108, the additional data packet to one or more relay communication nodes of the multi-node communication network 100 via a packet flooding procedure; receive an additional route response acknowledgment, via the communication interface 108, transmitted from the destination communication node to the source communication node along a recovered route; and transmit the additional data packet, via the communication interface 108, to the destination communication node along the recovered route.

Figure 2:
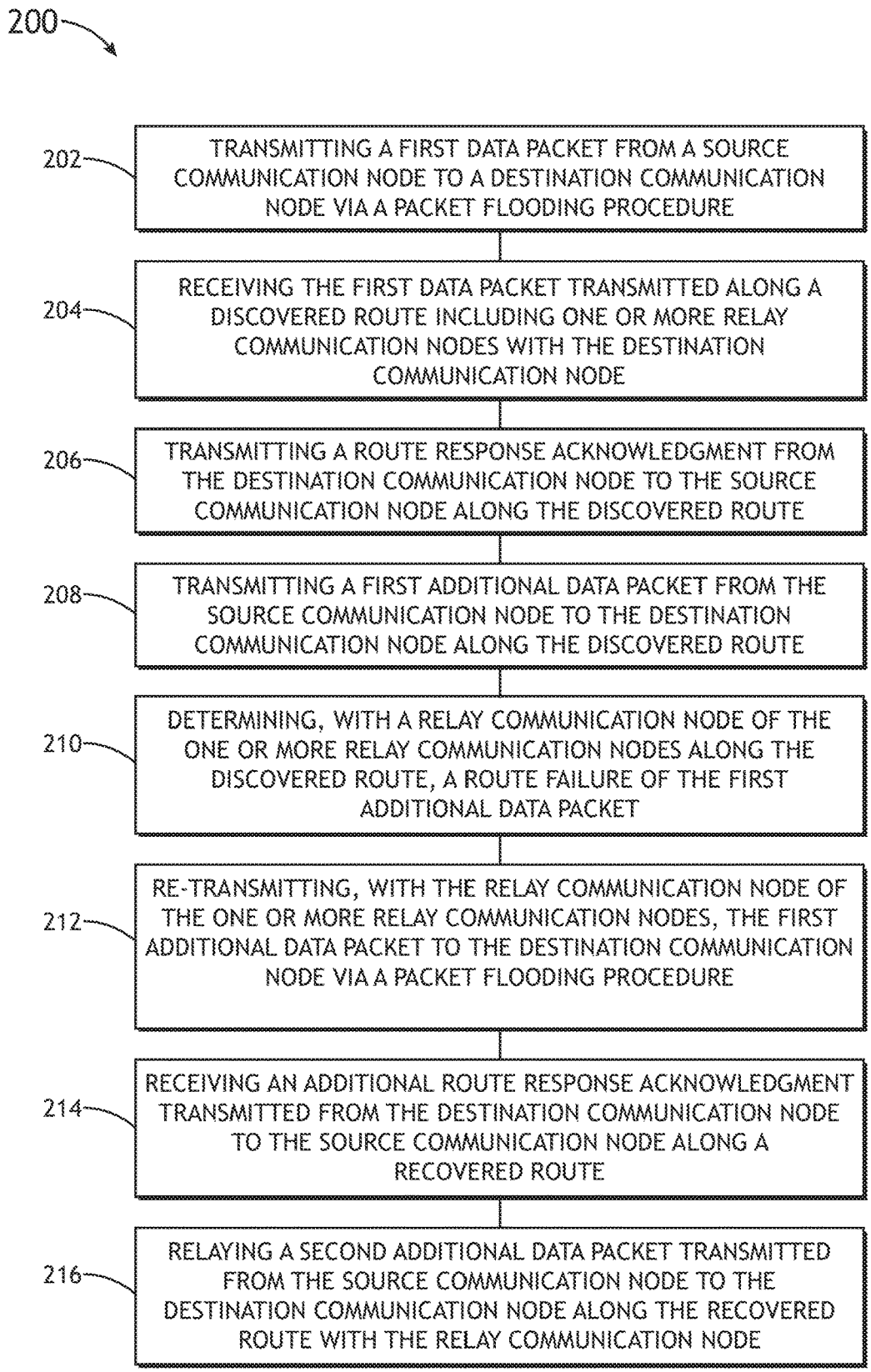
FIG. 2 illustrates a flowchart of a method for transmitting data within a multi-node communication network, in accordance with one or more embodiments of the present disclosure.

Each of these steps carried out by the controller 104 of a communication node 102 of the multi-node communication network 100 may be further shown and understood with reference to FIG. 2.

FIG. 2 illustrates a flowchart of a method 200 for transmitting data within a multi-node communication network 100, in accordance with one or more embodiments of the present disclosure. In particular, FIG. 2 illustrates a method 200 for transmitting data packets within a multi-node communication network 100 with "flooding-to-routing" communication techniques. It is noted herein that the steps of method 200 may be implemented all or in part by multi-node communication network 100. It is further recognized, however, that the method 200 is not limited to the multi-node communication network 100 in that additional or alternative system-level embodiments may carry out all or part of the steps of method 200.

In a step 202, a first data packet (e.g., Data Packet #1) is transmitted from a source communication node 102a of a multi-node communication network 100 to a destination communication node 102n via a packet flooding procedure. This may be further understood with reference to FIG. 3A.

Figure 3A:
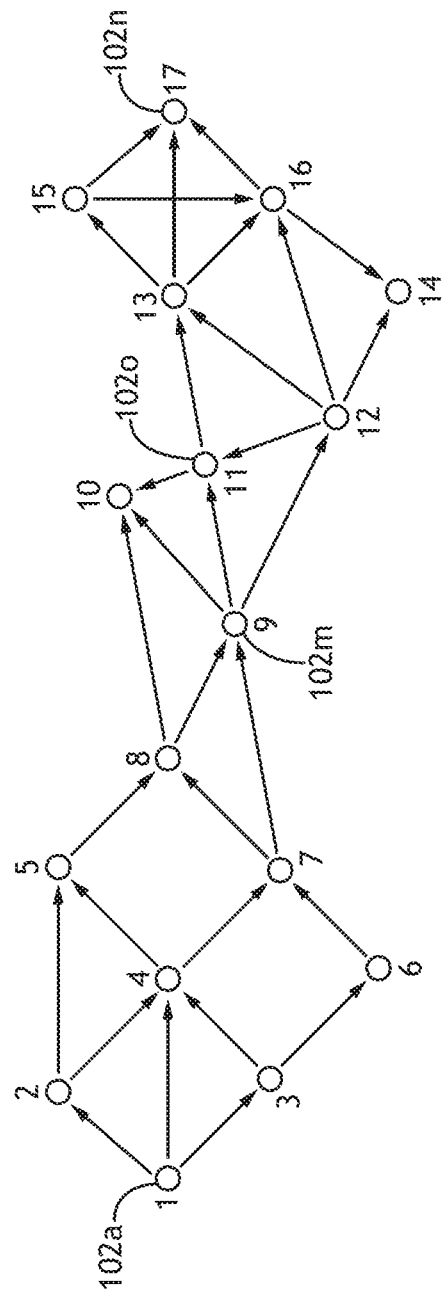
FIG. 3A illustrates a data packet transmitted through a multi-node communication network via a packet flooding procedure, in accordance with one or more embodiments of the present disclosure.

FIG. 3A illustrates a data packet transmitted through a multi-node communication network 100 via a packet flooding procedure, in accordance with one or more embodiments of the present disclosure. In particular, FIG. 3A illustrates a data packet (e.g., Data Packet #1) transmitted from a source communication node 102a of a multi-node communication network 100 to a destination communication node 102n via a packet flooding procedure.

In embodiments, the data packet (e.g., Data Packet #1) is transmitted through the multi-node communication network 100 via a packet flooding procedure, in which each communication node 102 is configured to receive the data packet and relay the data packet to other communication nodes 102 within the multi-node communication network 100. In this regard, relay communication nodes 102 may be configured to receive a data packet and relay (e.g., transmit) the data packet to one or more communication nodes 102 within the multi-node communication network 100 via a packet flooding procedure. For the purposes of the present disclosure, the term "relay communication node 102" may be used to refer to one or more communication nodes 102 between the source communication node 102a and the destination communication node 102n.

In embodiments, the data packet may include a source address and/or a destination address within the header of the data packet in order to facilitate anycasting (e.g., unicasting/multicasting) for purposes of flooding. For example, the data packet may include a source address indicating the data packet originates from the source communication node 102a, and a destination address (e.g., unicasting/multicasting address) indicating the data packet is intended to be delivered to the destination communication node 102n. It is contemplated herein that source/destination addresses may include any unique identifier configured to identify a communication node 102 of the multi-node communication network including, but not limited to, MAC address, IP address, a single byte address, and the like. It is noted herein that transmitting the data packet via a packet flooding procedure may enable the data packet (e.g., Data Packet #1) to be transmitted without any data regarding the topology of the multi-node communication network 100 and intermediate relay communication nodes 102.

In embodiments, each communication node 102 of the multi-node communication network 100 is configured to implement data packet bookkeeping in order to facilitate packet flooding. For example, each communication node 102 may be configured to add a unique identifier (e.g., MAC address, IP address, and the like) to the header of the data packet upon relaying the data packet in order to indicate the data packet was transmitted through the respective communication node 102. In this regard, data packets arriving at the destination communication node 102n may include identifying data in the header of the data packet indicating the number of communication nodes 102 each respective data packet was transmitted through from the source communication node 102a to the destination communication node 102n (e.g., a "hop count"). In embodiments, the controller 104 of each communication node 102 is configured to identify a time-stamp of each received and/or transmitted data packet, and store the time-stamps in memory 106.

It is further noted that data packets may be transmitted through the multi-node communication network 100 using any efficient packet flooding procedure known in the art. For example, data packets may be transmitted through the multi-node communication network 100 utilizing efficient flooding with passive clustering (EFPC). By way of another example, data packets may be transmitted via zero-overhead efficient flooding (ZOEF). ZOEF is described in further detail in U.S. patent application Ser. No. 16/369,398, filed Mar. 29, 2019, entitled ZERO-OVERHEAD EFFICIENT FLOODING, which is incorporated herein by reference in the entirety.

In embodiments, the Data Packet #1 transmitted through the multi-node communication network 100 may include a data packet of a larger data transmission to be transmitted from the source communication node 102a to the destination communication node 102n. In other words, a data packet transmitted via a packet flooding procedure (e.g., Data Packet #1) may include a fragmented internet protocol (IP) payload of a larger data transmission. In embodiments, a data transmission between the source communication node 102a to the destination communication node 102n may be broken up into data packets of equal (or substantially equal) size, such that a first data packet (e.g., Data Packet #1) is equal, or substantially equal, in size to subsequently transmitted data packets.

Accordingly, instead of utilizing traditional route-request packets and/or "hello" messages, the multi-node communication network 100 may utilize data packets of a larger data transmission in order to perform route discovery. In this regard, data packets of a data transmission may be transmitted via a flooding procedure as an implicit route request. By transmitting actual data packets of a data transmission in lieu of route-request topology-learning packets, the multi-node communication network 100 may enable more efficient network topography learning, eliminate initial route discovery/topology learning delay, and reduce route failure rate. For example, routes discovered with "short" route-request packets or "Hello" messages may not be suitable and/or appropriate to route actual data packets of a data transmission, which may be substantially longer than the short route-request packets or "Hello" messages. Thus, the longer data packets may experience additional route failures on top of route failures attributable to network topology changes. In particular, by transmitting a data packets which are approximately equivalent in size to other data packets of the data transmission to be sent, embodiments of the present disclosure may ensure discovered paths are suitable and/or appropriate for subsequent data packets to be transmitted.

It is contemplated herein that various flooding concepts and protocols may be utilized in order to optimize the packet flooding procedures used throughout the present disclosure to improve performance and reliability. For example, smart frame error recovery (SFER) and passive packet cross check (PPCC) concepts may be implemented during the packet flooding procedure in step 202. SFER is described in further detail in U.S. patent application Ser. No. 16/367,483, filed Mar. 28, 2019, entitled DATA FRAME ERROR RECOVERY FOR MULTI-NODE SYSTEMS, which is incorporated herein by reference in the entirety.

It is further contemplated herein that characteristics of the packet flooding procedure may be adaptively modified/adjusted based on one or more characteristics of the multi-node communication network 100 and the concept of operations (CONOPS). For example, the controller 104 of the source communication node 102a may determine the maximum transmission unit (MTU) of the multi-node communication network 100 and the size of the data packet (e.g., Data Packet #1) transmitted in step 202 based on the quality and congestion of the multi-node communication network 100. For instance, the controller 104 of the source communication node 102a may be configured to fragment a data transmission in to one or more data payloads (e.g., data packets) such that each data packet is less than or equal to the MTU of the multi-node communication network 100.

In a step 204, the first data packet (Data Packet #1) is received by the destination communication node 102n, wherein the first data packet was transmitted along a discovered route 110 including one or more relay communication nodes 102. This may be further understood with reference to FIG. 3B.

Figure 3B:
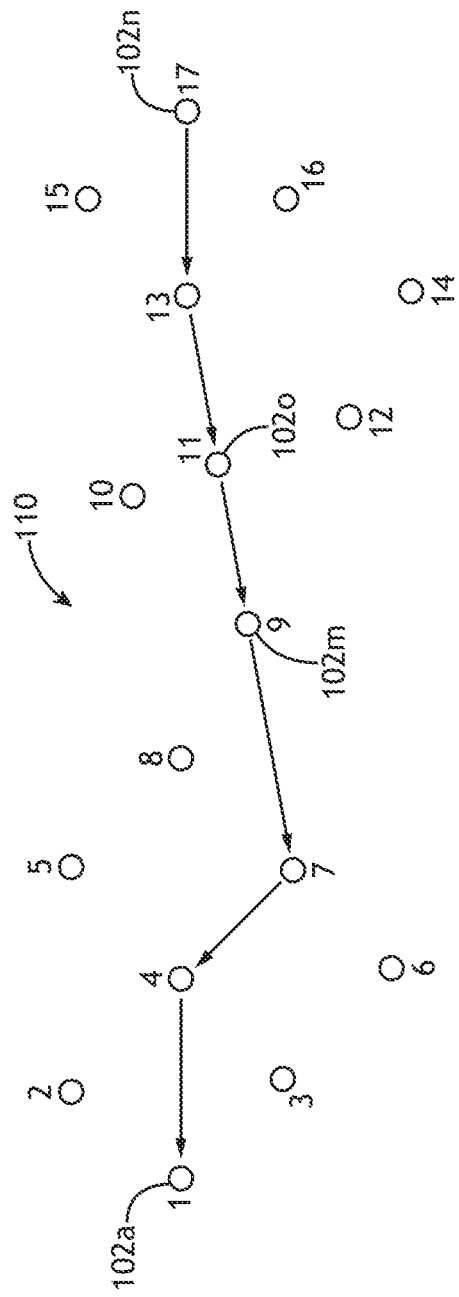
FIG. 3B illustrates a route response transmitted through a multi-node communication network along a discovered route, in accordance with one or more embodiments of the present disclosure.

FIG. 3B illustrates a route response transmitted through a multi-node communication network 100 along a discovered route 110, in accordance with one or more embodiments of the present disclosure. As shown in FIG. 3B, the destination communication node 102n may receive a copy of Data Packet #1 via a discovered route 110 including one or more relay communication nodes 102 of the multi-node communication network 100.

In a step 206, a route response is transmitted from the destination communication node 102n to the source communication node 102a along the discovered route 110.

For example, upon receiving a data packet transmitted from the source communication node 102a along a discovered route 110, the destination communication node 102n may identify the discovered route 110 and transmit a route response to the source communication node 102a along the discovered route 110. In particular, the destination and relay communication nodes 102n may be configured to store a routing table in memory 106 associated with a route taken by the received data packet, as determined by the data packet flooding process. The controller 104n of the destination communication node 102n may be further configured to time-stamp the stored routing table.

In this regard, the destination communication node 102n may transmit a route response to the source communication node 102a via one or more relay communication nodes 102 along the discovered route 110 via a point-to-point communication (e.g., non-flooding). Similarly, each relay communication node 102 along the discovered route 110 may be configured to receive the route response and relay (e.g., transmit) the route response along the discovered route 110 to the source communication node 102a. In embodiments, the controller 104n of the destination and relay communication nodes 102n may be configured to store a routing table associated with the identified discovered route 110 in memory 106n. Moreover, the route response may include information associated with a destination address of the destination communication node 102n as well as an address of the sender of the route response, which may be different from the destination communication node 102n, as will be described in further detail herein.

By transmitting reverse path notifications (e.g., route responses), one or more routes may be constructed between the source communication node 102a and the destination communication node 102n. Furthermore, the controller 104 of each communication node 102 may be configured to store a routing table associated with the discovered route 110. For the purposes of the present disclosure, the term "routing table" may be used to refer to a soft-state local list of neighboring nodes communicatively coupled to the respective communication node 102 "upstream" and "downstream" from the communication node 102 along the discovered route 110. Routing tables may be constructed and stored in memory of each communication node 102 based on unique identifiers and hop counts stored in the header of data packets/route request acknowledgements. Furthermore, each communication node 102 may be configured to update a routing table upon receipt of a data packet and/or route request acknowledgement, and time-stamp the updated routing table. In this regard, reception of data packets and/or route request acknowledgements within the multi-node communication network 100 may serve to cause communication nodes 102 to update routing tables between the source communication node 102a and the destination node 102n to ensure routes used remain fresh and viable. This will be discussed in further detail herein.

It is noted herein that the first copy of the data packet (e.g., Data Packet #1) transmitted via the packet flooding procedure may oftentimes be transmitted along the most direct route between the source communication node 102a and the destination communication node 102n. However, this may not always be the case. In this regard, the controller 104n of the destination communication node 102n may be configured to select a particular route as the discovered route 110 based on any number of characteristics of the received copies of Data Packet #1 including, but not limited to, transmission time, hop count, traffic/congestion along each route, and the like.

For example, the destination communication node 102n may identify a first discovered route 110a upon receipt of a first copy of Data Packet #1. The destination communication node 102n may then be configured to store a routing table associated with the first discovered route 110a in memory 106 and transmit a route response along the first discovered route 110a. Subsequently, the communication node 102n may receive another copy of the Data Packet #1 which was transmitted along a second discovered route 110b which is more direct than the first discovered route 110 (e.g., lower hop count). In this example, the destination communication node 102n may be configured to update the routing table (and time-stamp) stored in memory 106n in order to replace the first discovered route 110a with the second discovered route 110b, and transmit a route response along the second route 110b. Furthermore, the controller 104n of the destination communication node 102n may be configured to use subsequently received copies of the flooded data packet (e.g., Data Packet #1) to populate routes/routing tables to various relay communication nodes 102 for future reference and retrieval. In embodiments, each relay communication node 102 is configured to store a routing table associated with the discovered route 110 in memory 106.

Upon the establishment of a discovered route 110, subsequent data packets may be transmitted directly from the source communication node 102a to the destination communication node 102n along the discovered route 110. This may be further understood with reference to FIG. 3C.

Figure 3C:
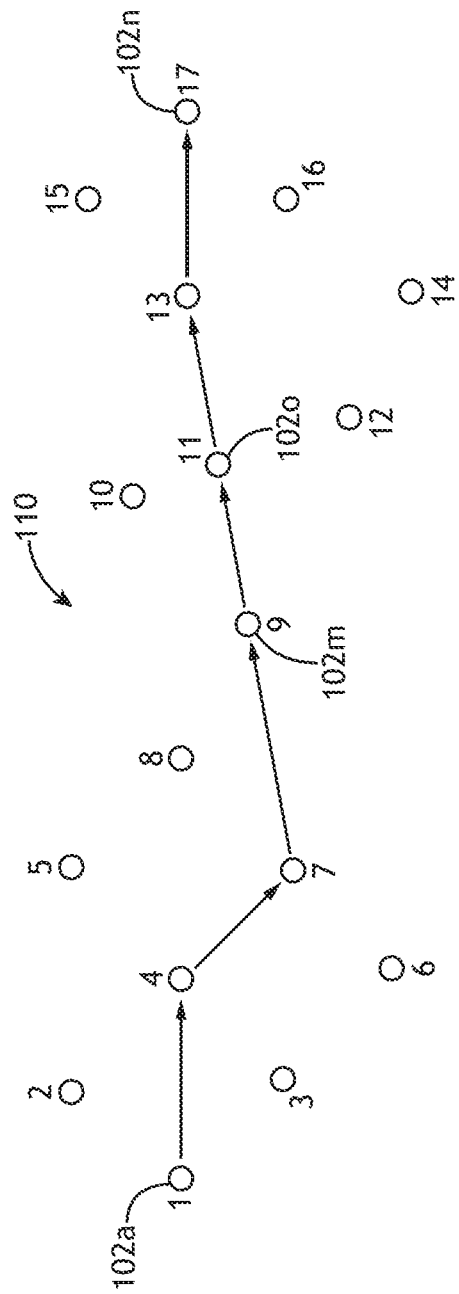
FIG. 3C illustrates a data packet transmitted through a multi-node communication network along a discovered route, in accordance with one or more embodiments of the present disclosure.

FIG. 3C illustrates a data packet transmitted through a multi-node communication network 100 along a discovered route 110, in accordance with one or more embodiments of the present disclosure.

In embodiments, upon receiving the route response (via communication interface 108) from the destination communication node 102n via discovered route 110, the controller 104a of the source communication node 102a may store a routing table associated with the discovered route 110 in memory 106, and time-stamp the stored routing table. Subsequently, the source communication node 102a may transmit one or more subsequent data packets to the destination communication node 102*n* via the communication interface 108*a* along the discovered route 110.

In embodiments, upon identifying and establishing a discovered route 110 via a packet flooding procedure and one or more route responses, the multi-node communication network 100 may be configured to transmit data packets of a larger data transmission via conventional point-to-point routing utilizing routing tables. In this regard, after flooding is used to establish the discovered route 110, the source communication node 102*a* may transmit subsequent data packets directly to the destination communication node 102*n* via a point-to-point routing transmission based on routing tables. Utilizing a flooding-to-routing communication protocol, as described herein, may reduce the amount of flooding required for data transmission, and may therefore reduce traffic throughout the system and enable improved spectrum utilization and efficiency.

In embodiments, each relay communication node 102 (e.g., relay communication node 102*m*) along the discovered route 110 may be configured to receive the subsequent data packets, via a communication interface 108, and relay (e.g., transmit) the received data packets along the discovered route 110 via a conventional routing procedure. Further, each relay communication node 102 may be configured to store a routing table associated with the discovered route 110 in memory 106, time-stamp stored routing tables, and update the stored routing tables upon reception and/or transmission of a data packet.

Upon receiving one or more route responses from the destination communication node 102*n*, the source communication node 102*a* may elect to transmit one or more data packets via a packet flooding procedure if the discovered route 110 exhibits a hop count which is excessive or undesirable. In this regard, the controller 104*a* of the source communication node 102*a* may be configured to identify a hop count of the discovered route 110 (via the header), and determine whether to transmit subsequent packets via a packet flooding procedure based on the identified hop count. This may be done in order to identify additional discovered routes 110 which may exhibit shorter and more desirable hop counts.

In a step 208, a first additional data packet (Data Packer #M) is transmitted from the source communication node 102*a* to the destination communication node 102*n* along the discovered route 110. In a step 210, a route failure of the transmitted first additional data packet (Data Packer #M) is determined with a relay communication node 102*m* of the one or more relay communication nodes 102 along the discovered route 110. This may be further understood with reference to FIG. 3D.

Figure 3D:
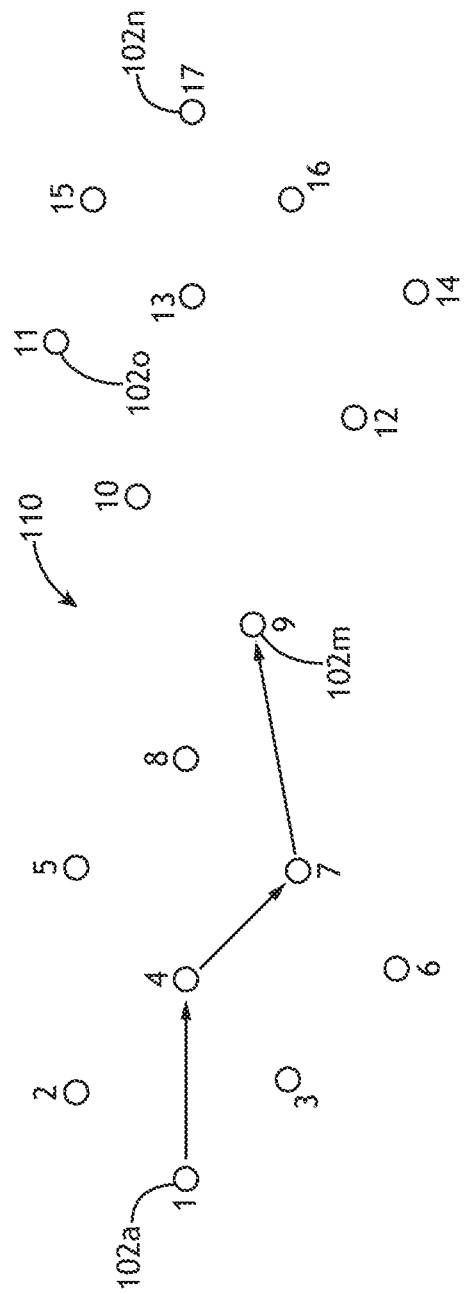
FIG. 3D illustrates a route failure of a data packet transmitted through a multi-node communication network, in accordance with one or more embodiments of the present disclosure.

FIG. 3D illustrates a route failure of a data packet (Data Packet #M) transmitted through a multi-node communication network 100, in accordance with one or more embodiments of the present disclosure.

As shown in FIG. 3D, a first additional data packet (e.g., Data Packet #M) may be transmitted via conventional point-to-point routing from the source communication node 102*a* to the destination communication node 102*n*. While en route, a relay communication node 102*m* (e.g., Communication Node 9) may determine a route failure of the Data Packet #M, in that Data Packet #M was not successfully delivered to the next communication node 102 (e.g., Communication Node 11) along the discovered route 110.

Figure 3E:
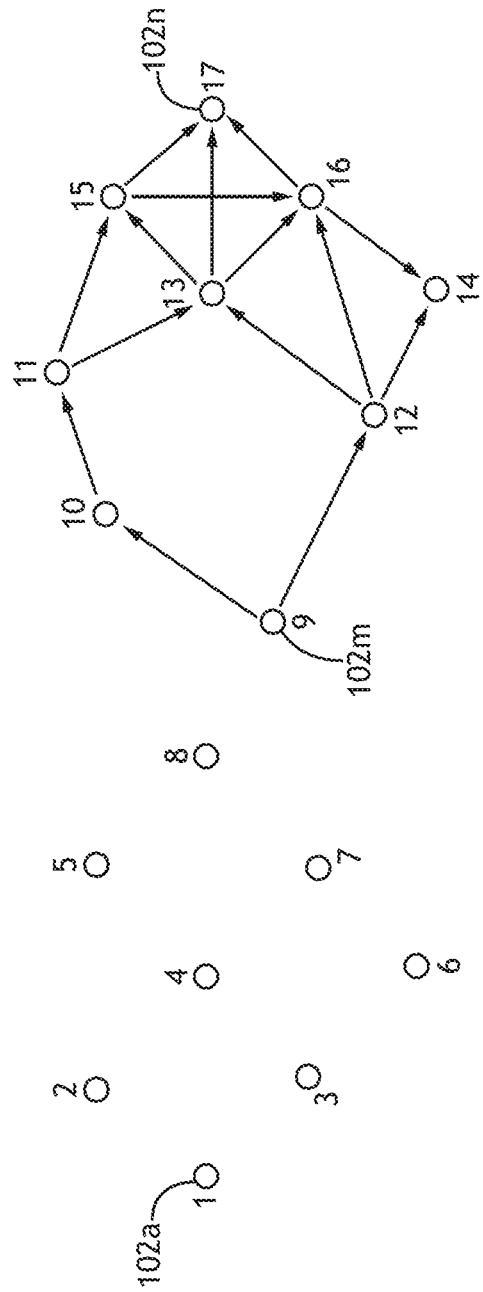
FIG. 3E illustrates a data packet transmitted through a multi-node communication network via a packet flooding procedure, in accordance with one or more embodiments of the present disclosure.

It is noted herein that a route failure may be attributable to any number of factors. For example, a route failure may be attributable to weather conditions, terrestrial obstructions, channel congestion, and the like. By way of another example, a route failure may be attributable to communication nodes 102 moving out of range from one another. For instance, as shown in FIGS. 3D-3E, a routing failure may be attributable to relay communication node 102*o* moving out of range from the relay communication node 102*m*.

Communication nodes 102 (e.g., relay communication node 102*m*) within the multi-node communication network 100 may be configured to identify/determine route failures using any technique known in the art. For example, in some embodiments, receiving communication nodes 102 may be configured to transmit acknowledgement messages (e.g., ACKs) to associated transmitting communication nodes 102 upon reception of a data packet. In this regard, acknowledgement messages may indicate successful transmission of a data packet, while the absence of acknowledgement messages may function as negative-acknowledgement messages (e.g., NAKs) and indicate a route failure.

For instance, as shown in FIG. 3D, the relay communication node 102*m* may transmit Data Packet #M to relay communication node 102*o* along the discovered route 110 at a first time. The controller 104*m* of the relay communication node 102*m* may be configured to store a transmittal time (e.g., first time) of the Data Packet #M in memory 106*m*. Continuing with the same example, the controller 104*m* of the relay communication node 102*m* may subsequently identify the absence of an acknowledgement message from the relay communication node 102*o* at a second time, and store the second time in memory. In this example, the controller 104*m* may be configured to identify a route failure if a time difference between the second time and the first time exceeds a routing timeout threshold. In this regard, communication nodes 102 within the multi-node communication network 100 may be configured to determine a route failure if an acknowledgement message is not received in a pre-determined amount of time (e.g., routing timeout threshold) after transmitting a data packet.

In additional and/or alternative embodiments, communication nodes 102 within the multi-node communication network 100 may be configured to determine a route failure based on signals and/or data within a lower layer of the multi-node communication network 100. In this regard, the controller 104 of a communication node 102 may be configured to predict a breakage of a lower layer, and therefore a routing failure, without having to identify the absence of an acknowledgement message (e.g., implicit NAK). By way of another example, a controller 104 may be configured to determine a route failure based on data within the physical layer indicative of boundary conditions of the communication.

In embodiments, after identifying a route failure, a controller 104 of communication nodes 102 may be configured to remove the routing entry associated with the route failure from the routing table of the discovered route 110 stored in memory 106. For example, upon identifying the route failure, the controller 104*m* of the relay communication node 102*m* may be configured to remove the routing entry associated with relay communication node 102*o* and the route failure from the routing table of the discovered route 110 stored in memory 106*m*.

In a step 212, the additional data packet is re-transmitted to one or more communication nodes of the multi-node communication network via a packet flooding procedure with the relay communication node of the one or more relay communication nodes. This may be further understood with reference to FIG. 3E.

FIG. 3E illustrates a data packet (Data Packet #M) transmitted through a multi-node communication network 100 via a packet flooding procedure, in accordance with one or more embodiments of the present disclosure.

In embodiments, a data packet (e.g., Data Packet #M) which was not successfully transmitted due to a route failure may be re-transmitted to one or more communication nodes 102 via a packet flooding procedure. It is contemplated herein that transmitting the Data Packet #M via a packet flooding procedure may be carried out in order to recover a route to the destination communication node 102n. It is further contemplated herein that recovering a route to the destination communication node 102n at the location of the route failure, instead of from the source communication node 102a, may expedite the route recovery time, and preserve portions of routes (e.g., discovered route 110) which are still fresh and viable.

For example, as shown in FIG. 3E, the relay communication node 102m may re-transmit Data Packet #M via a packet flooding procedure after identifying the route failure in the step 210. Before transmitting Data Packet #M, the communication node 102m may store a destination address (e.g., broadcasting/anycasting address) of the destination communication node 102n in the header of the flooded data packet. It is noted herein that characteristics of the packet flooding procedure shown and described with reference to step 202 may be regarded as applying to the packet flooding procedure in step 212, unless noted otherwise herein. In this regard, the packet flooding procedure utilized in step 212 may include any packet flooding procedure known in the art including, but not limited to, EFPC, ZOEF, and the like.

In a step 214, an additional route response is transmitted from the destination communication node 102n to the source communication node 102a along a recovered route 112 with the relay communication node 102m of the one or more relay communication nodes 102. This may be further understood with reference to FIG. 3F.

Figure 3F:
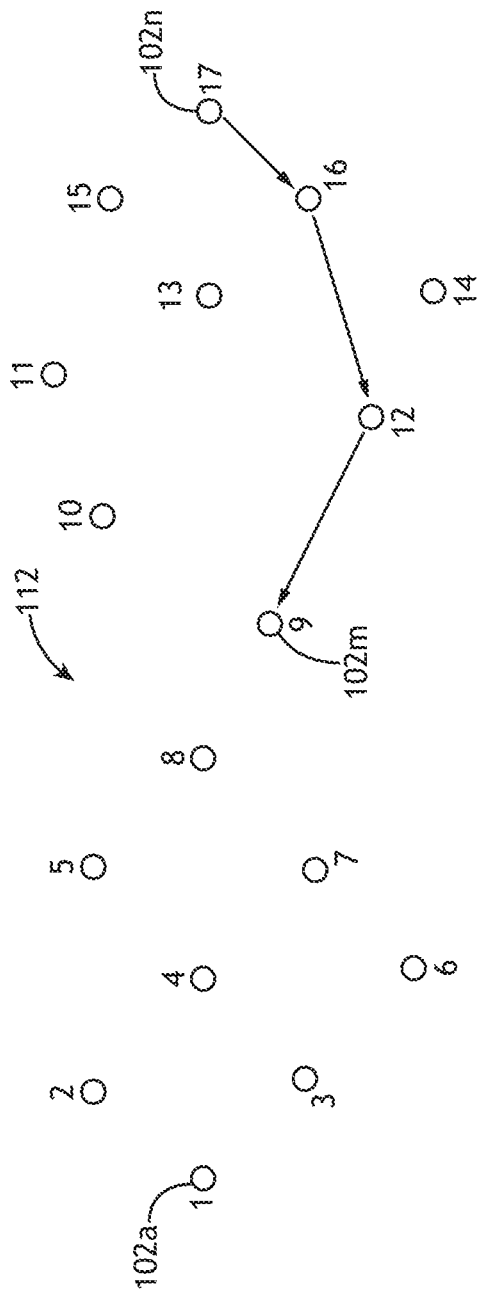
FIG. 3F illustrates a route response transmitted through a multi-node communication network along a recovered route, in accordance with one or more embodiments of the present disclosure.

FIG. 3F illustrates a route response transmitted through a multi-node communication network 100 along a recovered route, in accordance with one or more embodiments of the present disclosure.

As shown in FIG. 3F, the destination communication node 102n may receive a copy of Data Packet #M via a recovered route 112 including one or more relay communication nodes 102 of the multi-node communication network 100. The recovered route 112 may be different from the discovered route 110 in that the recovered route 112 may include one or more additional, fewer, and/or alternative relay communication nodes 102 as compared to the discovered route 110.

In embodiments, the destination communication node 102n may receive a number of copies of the Data Packet #M transmitted via a packet flooding procedure. It is noted herein that the first copy of the data packet (e.g., Data Packet #M) transmitted via the packet flooding procedure may oftentimes be transmitted along the most direct route between the relay communication node 102m and the destination communication node 102n. However, this may not always be the case. In this regard, the controller 104n of the destination communication node 102n may be configured to select a particular route as the recovered route 112 based on any number of characteristics of the received copies of Data Packet #M including, but not limited to, transmission time, hop count, traffic/congestion along each route, and the like. Upon receiving one or more copies of the Data Packet #M, the controller 104n of the destination communication node 102n may be configured to replace the routing table associated with the discovered route 110 stored in memory 106 with a routing table associated with the recovered route 112, and update a time-stamp associated with the updated routing table.

In embodiments, each relay communication node 102 along the recovered route 112 between the destination communication node 102n and the relay communication node 102m may be configured to receive the route response and relay the route response along the recovered route 112 to the relay communication node 102m, as shown in FIG. 3F. Additionally, the relay communication node 102m and each relay communication node 102 may be configured to replace the routing table associated with the discovered route 110 a routing table associated with the recovered route 112, and time-stamp the updated routing table.

In a step 216, a second additional data packet (Data Packet #N) transmitted from the source communication node 102a to the destination communication node 102n is relayed along the recovered route 112 with the relay communication node 102m. This may be further understood with reference to FIG. 3G.

Figure 3G:
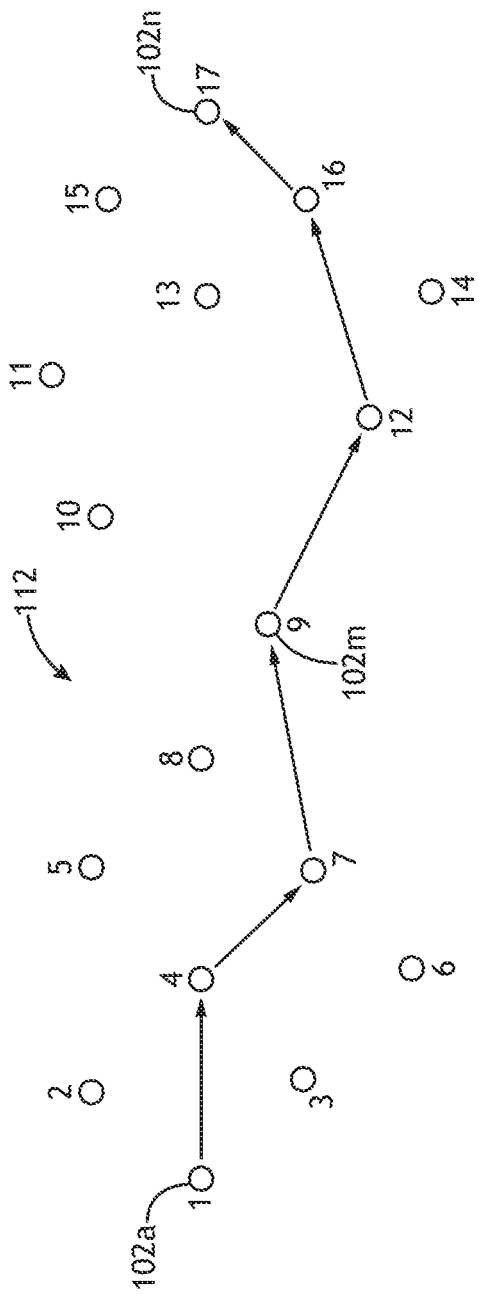
FIG. 3G illustrates a data packet transmitted through a multi-node communication network along a recovered route, in accordance with one or more embodiments of the present disclosure.

FIG. 3G illustrates a data packet (Data Packet #N) transmitted through a multi-node communication network 100 along a recovered route 112, in accordance with one or more embodiments of the present disclosure.

In embodiments, upon identifying and establishing a recovered route 112 (and updating routing tables to correspond to the recovered route 112), subsequent data packets may be transmitted via conventional point-to-point routing utilizing the routing table from the source communication node 102a to the destination communication node 102n along the recovered route 112. For example, a second additional data packet (Data Packet #N) may be transmitted from the source communication node 102a to the destination communication node 102n along the recovered route 112 via point-to-point routing based on the stored routing table associated with the recovered route 112.

Figure 4:
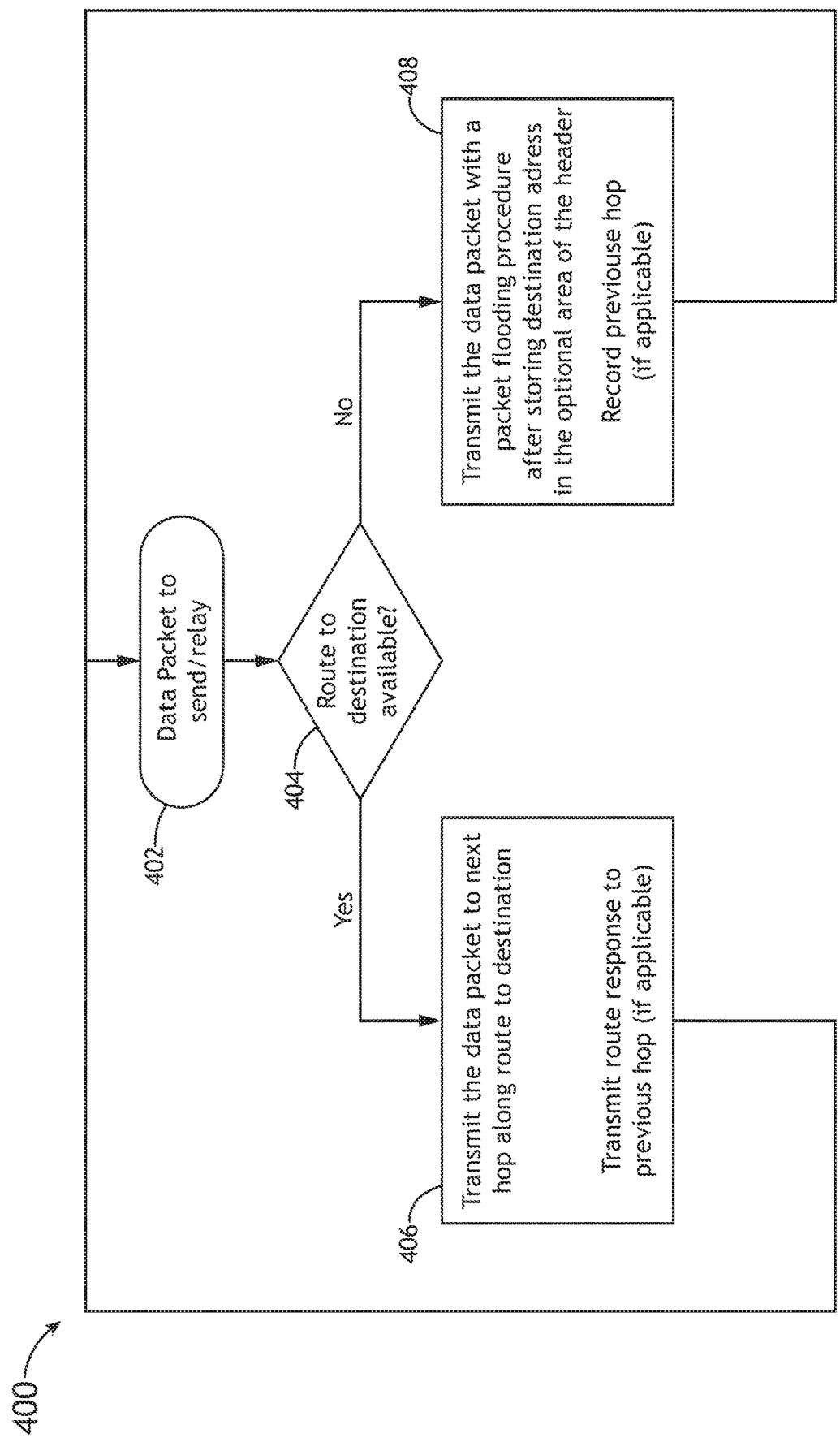
FIG. 4 illustrates a flowchart of a method for transmitting data within a multi-node communication network, in accordance with one or more embodiments of the present disclosure.

FIG. 4 illustrates a flowchart of a method 400 for transmitting data within a multi-node communication network 100, in accordance with one or more embodiments of the present disclosure. It is noted herein that the steps of method 400 may be implemented all or in part by multi-node communication network 100 and/or method 200. It is further recognized, however, that the method 400 is not limited to the multi-node communication network 100 and/or method 200 in that additional or alternative system-level embodiments may carry out all or part of the steps of method 400.

In a step 402, a communication node 102 of a multi-node communication network 100 identities a data packet which is to be transmitted and/or relayed. For example, as shown in FIGS. 3A-3G, a relay communication node 102m may receive a data packet transmitted from the source communication node 102a. The relay communication node 102m may identify the data packet as being needed to be relayed to the destination communication node 102n via a destination address in a header of the data packet.

In a step 404, the communication node 102 determines whether there is an available route to the destination communication node 102n. For example, the controller 104m of the relay communication node 102m may determine whether there is a routing table stored in memory 106m associated with a discovered route 110 to the destination communication node 102n.

If there is an available route to the destination communication node 102n (Step 404="Yes"), method 400 may proceed to a step 406 and a step 408. In a step 406, the communication node 102 transmits the data packet to the next hop along the route to the destination. The communication node 102 may further transmit a route response to the previous hop (e.g., previous communication node 102), if applicable. For example, as shown in FIG. 3C, the relay communication node 102m may transmit the data packet to the relay communication node 102o along the discovered route 110 from the source communication node 102a to the destination communication node 102n.

If there is no available and/or fresh route to the destination communication node 102n in step 404 (Step 404="No"), method 400 may proceed to a step 408. In a step 408, the communication node 102 transmits the data packet to one or more communication nodes 102 of the multi-node communication network 100 via a packet flooding procedure after storing the destination address of the destination communication node 102n in the header of the data packet. In addition to transmitting the data packet via a packet flooding procedure, the communication node 102 may further be configured to record the previous hop (e.g., previous communication node 102) by updating a routing table to the source communication node 102a in memory 106 and add a unique identifier associated with the communication node 102 in the header of the data packet in order to implement flooding with bookkeeping. For example, as shown in FIG. 3D, the relay communication node 102m may transmit the data packet to one or more communication nodes 102 via a packet flooding procedure in order to recover a route from the relay communication node 102m to the destination communication node 102n. The one or more communication nodes 102 may further be configured to relay the received data packet via a packet flooding procedure to the destination communication node 102n.

Figure 5:
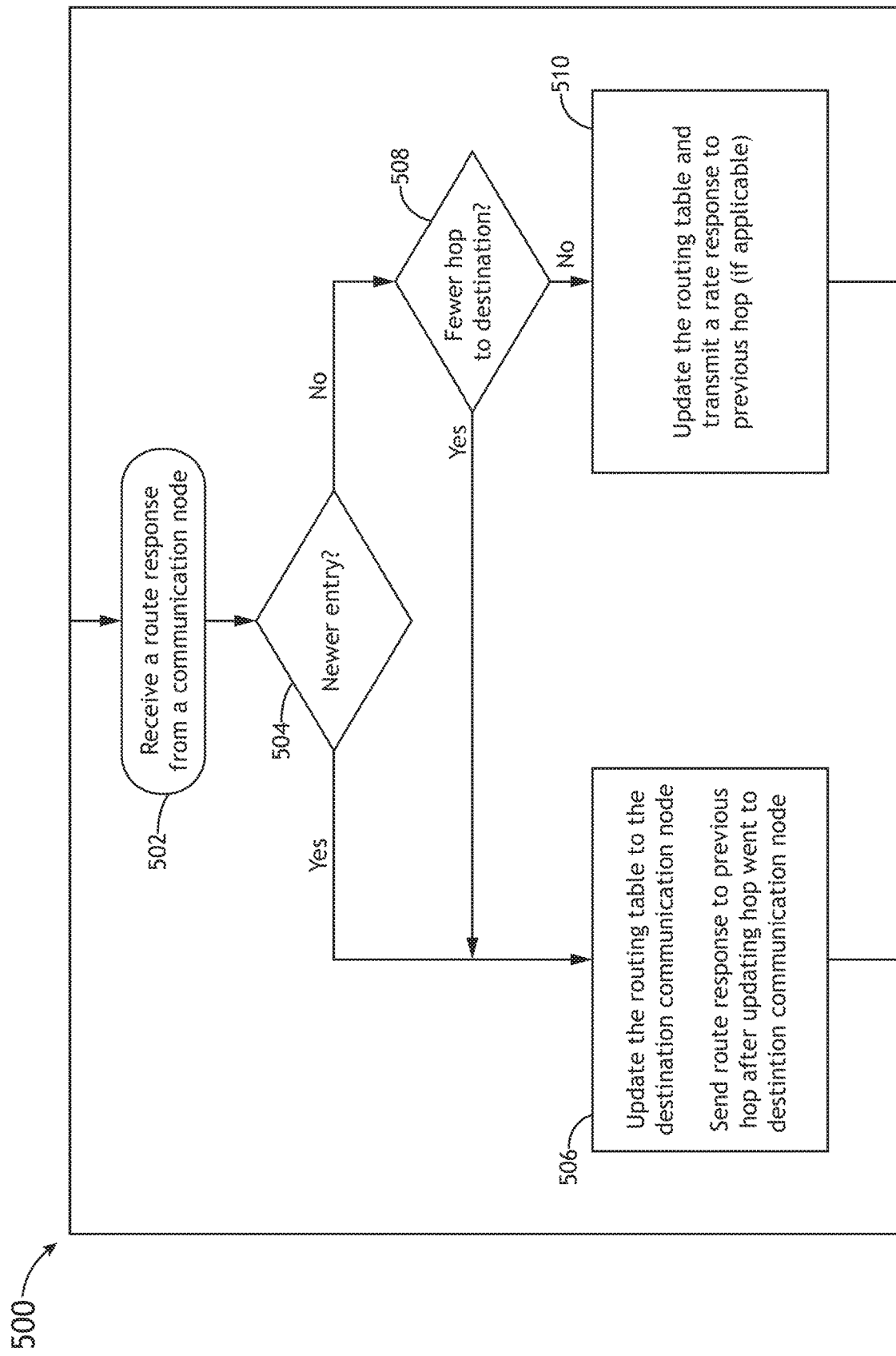
FIG. 5 illustrates a flowchart of a method for transmitting data within a multi-node communication network, in accordance with one or more embodiments of the present disclosure.

FIG. 5 illustrates a flowchart of a method 500 for transmitting data within a multi-node communication network 100, in accordance with one or more embodiments of the present disclosure. It is noted herein that the steps of method 500 may be implemented all or in part by multi-node communication network 100 and/or method 200. It is further recognized, however, that the method 500 is not limited to the multi-node communication network 100 and/or method 200 in that additional or alternative system-level embodiments may carry out all or part of the steps of method 500.

In particular, method 500 may illustrate a method carried out by communication nodes 102 of a multi-node communication network 100 to update routing tables and discovered/recovered routes when a route response is received.

In a step 502, a communication node 102 receives a route response from another communication node 102. For example, after a data packet is transmitted throughout the multi-node communication network 100 from the source communication node 102a to the destination communication node 102n, the destination communication node 102n may transmit a route response along a discovered route 110 and/or recovered route 112 back to the source communication node 102n. For instance, as shown in FIG. 3B, the relay communication node 102m may receive a route response from the relay communication node 102o.

In a step 504, the controller 104 of the communication node 102 determines whether the route response was received from a newer entry (e.g., new communication node 102). For example, if the relay communication node 102m had not previously received a route response from the relay communication node 102o, the controller 104m of the relay communication node 102m may be configured to determine that the relay communication node 102o is a new entry.

If the controller 104 of the communication node 102 determines it is a new entry (e.g., new communication node 102 which transmitted the route response) in step 504, method 500 proceeds to a step 506. In a step 506, upon determining the route response was received from a new entry (e.g., new communication node 102), the controller of the communication node 102 updates the routing table to the destination communication node 102n stored in memory 106 based on the hop count and unique identifiers within the header of the route response. In this regard, the communication node 102 may update the routing table to reflect the new route from the source communication node 102a to the destination communication node 102n. The controller 104 may be further configured to update hop count of and update a time-stamp associated with the updated routing table. The controller 104 may then be further configured to transmit the route response, via communication interface 108, to the next upstream hop along the route to the source communication node 102a after updating the hop count to the destination communication node 102n. For example, the relay communication node 102m may transmit the route response to the Communication Node 7 (e.g., upstream hop) toward the source communication node 102a.

If the controller 104 of the communication node 102 determines it is not a new entry (e.g., new communication node 102 which transmitted the route response) in step 504 (Step 504="No"), method 500 proceeds to a step 508.

In a step 508, the controller 104 determines whether the route associated with the received route response is shorter than the route associated with the routing table stored in memory 106. For example, the relay communication node 102m may have previously received route responses from the relay communication node 102o (e.g., Step 504="No"). However, a subsequent route response received from the relay communication node 102o may indicate a shorter hop count between the relay communication node 102o and the destination communication node 102n, and therefore a shorter route between the source communication node 102a and the destination communication node 102n (e.g., Step 510="Yes"). In this example, the controller 104 may be configured to identify a shorter hop count to the destination communication node 102n (Step 508="Yes"), in which case method 500 may proceed to step 506, as described previously herein.

If the controller 104 of the communication node 102 determines that the received route response does not represent a route with a lower hop count to the destination communication node 102n (e.g., Step 508="No"), method 500 may proceed to a step 510.

In a step 510, the controller 104 updates the routing table and a time stamp associated with the routing table stored in memory 106. The controller 104 may then be configured to transmit/relay the route response to the next upstream hop, if applicable. For example, the relay communication node 102m may transmit the route response to the Communication Node 7 (e.g., upstream hop) toward the source communication node 102a.

Referring generally now to FIGS. 6-12, exemplary embodiments pertaining to a multi-node communication network 100 configured to use beaconless allocation of slots to reserve transmission resources are shown. In some embodiments, the multi-node communication network 100 may be a mobile ad-hoc network (MANET) having a multiple-hop diameter. In some embodiments, the multi-node communication network 100 may further be configured to use the beaconless allocation of the slots to reserve the transmission resources via soft state reservations, and each soft state reservation may reserve at least one time slot until said soft state reservation times out as being unused for a predetermined duration or until said soft state reservation is released by a reserving node of the multi-node communication network 100. For example, each slot may be a channel slot, a time slot, and/or a directionality slot. For example, the slots may be time division multiple access (TDMA) slots. For example, the beaconless allocation of the slots may lack any additional network control transmissions (e.g., additional network control transmissions beyond network control transmissions that may be used for functions other than allocation of slots). Many networks have some sort of periodic or aperiodic beacons for various functions, such as dynamic time slot allocation, routing, distributed time synchronization, etc. Some embodiments do not require any additional transmissions other than traffic transmissions and piggyback all other network control information in the same transmissions as traffic. For example, transmission resources may be and/or may include time and/or channel (e.g., for stacked networks). The channel can be frequency division, code division (e.g., for spread spectrum), or spatial division (e.g., for directionality).

In some embodiments, additional resources can be requested by a sender node by using contentions free data transmission piggybacking the additional resource request, and resources can be immediately allocated and/or de-allocated. Some embodiments may use a soft-state resource allocation to assure instantaneous and adequate modifications on assigned bandwidth for a requesting node that needs to transmit.

In some embodiments, the beaconless allocation of slots may be a beaconless allocation of contention slots and/or beaconless resource allocation.

In some embodiments, the beaconless allocation of slots may be a beaconless allocation of contention slots. For example, non-cooperative transmission procedures (e.g., flooding-to-routing (F2R)) can deliver data without prior establishments of routes. For example, a data packet, which is sent to known destination(s), may be delivered via flooding (e.g., with destination address(es) in an optional IP header). For example, route responses may establish hop-by-hop routes for unicasting and/or multicasting. For example, data forwarding and/or route responses may schedule and/or reserve media for active communications; for example, the first data forwarding from a source to a destination may carry a vector of additional reservation information. For example, the reservations may be soft-state reservations that can be cancelled by a time out or an explicit release so as to allow for making unused reserved slot resources available to other nodes; the soft-state reservation can be maintained (e.g., refreshed and/or updated) through a continued flow of traffic on the allocated slot(s).

In some embodiments, the multi-node communication network 100 may be configured for the beaconless allocation of the slots to reserve the transmission resources with or without cooperative broadcasting (CB). Cooperative broadcasting can improve message completion rate (MCR) and can reduce a number of time slots required to flood traffic. For example, cooperative broadcasting can reduce the need to figure out link qualities and routing; cooperative broadcasting can just reserve transmission resources without a need for route response. For example, cooperative broadcasting may include an avalanche relay communication technique; the avalanche relay communication technique is described in further detail in U.S. Pat. No. 4,639,937, entitled HF AVLANCHE RELAY COMMUNICATION TECHNIQUE, which is incorporated herein by reference in the entirety. Without cooperative broadcasting, some embodiments can use F2R procedures to deliver the first few data packets with a reservation. For F2R, while there may be no guarantee that resource allocation is successful, data forwarding can be used to reserve an additional channel and route responses can confirm the reservation.

In some embodiments, the multi-node communication network 100 may be configured for the beaconless allocation of the slots to reserve the transmission resources via data forwarding efficient flooding and intermittent point to point forwarding. For example, data forwarding flooding packet can request the resource, and resource request can be piggy backed in the point to point forwarding.

In some embodiments, the multi-node communication network 100 may be configured for the beaconless allocation of the slots to reserve the transmission resources via route responses. For example, the response can be issued from destinations instead of intermediate nodes, who have fresh enough route to destination.

In some embodiments, the multi-node communication network 100 may be configured to use one of cooperative transmissions or non-cooperative transmission procedures (e.g., flooding-to-routing (F2R) procedures) for the beaconless allocation of the slots to reserve the transmission resources. In some embodiments using cooperative transmissions, traffic can be flooded without need of routing information; for example, a flow can be any transmission and can include traffic to different destinations, and if a network is configured for an H (a positive integer) hop diameter, then H slots may be required per flow (e.g., one slot for initial transmission and one slot for each of H-1 relay hops). A multiple-hop diameter network refers to a network where some nodes have to relay using other nodes to reach a desired destination(s). In some embodiments that do not use cooperative transmissions, a flow may be routed so that the flow may only include traffic to specific destination(s); a flow may require some number of slots (e.g., one slot for initial transmit and one slot for each needed relay hop, which can vary depending on unicast or multicast traffic and whether flow is single relay per hop wide or multiple relayers per hop wide).

In some embodiments, the multi-node communication network 100 may be configured to use one of preconfigured transmission slots or contentions slots for the beaconless allocation of the slots to reserve the transmission resources. In some embodiments using preconfigured transmission slots, the nodes may be preassigned static slot(s) that the nodes can use for a first transmission in a flow. In some embodiments not using preconfigured transmission slots, the nodes may do random access for a first transmission in a flow. In some embodiments, the use of preconfigured slots may require the use of contention access slots until a time synch is performed.

In some embodiments, the multi-node communication network 100 may be configured to use one of dynamically allocatable slots or no dynamically allocatable slots for the beaconless allocation of the slots to reserve the transmission resources. In some embodiments using dynamically allocatable slots, dynamically allocatable traffic slots may be used to carry a flow. In some embodiments using no dynamically allocatable slots, all traffic may flow in preconfigured slots or contention access slots.

In some embodiments, the multi-node communication network 100 may be configured to use one of network-wide time synchs or beaconless time synchronization for the beaconless allocation of the slots to reserve the transmission resources. In some embodiments using network-wide time synchs, nodes can transmit in known slot positions (e.g., statically assigned slots and/or allocatable slots). In some embodiments using beaconless time synchronization, nodes do not know slot positions such that all slots may be treated as contention access and such that all nodes may send a node-specific time synch information to synch up with other nodes in the network; for example, the node-specific time-synch may be one-way such that the time slots may require larger propagation guard time error.

Figure 6:
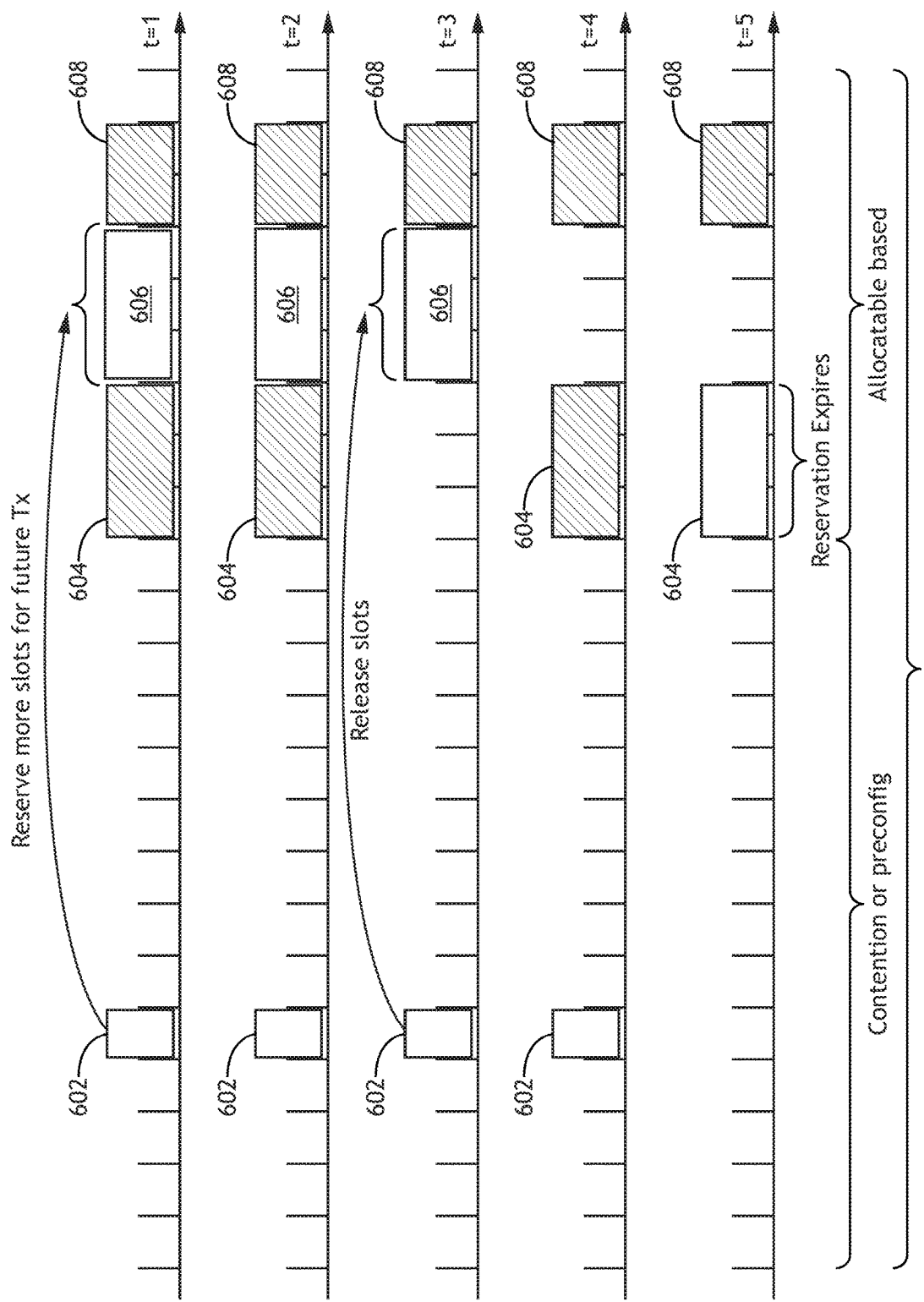
FIG. 6 illustrates a multi-node communication network using beaconless allocation of slots to reserve transmission resources via soft state reservations, in accordance with one or more embodiments of the present disclosure.

Referring now to FIG. 6, FIG. 6 illustrates the multi-node communication network 100 using (at times, t=1 through t=5) beaconless allocation of slots to reserve transmission resources via soft state reservations, and each soft state reservation may reserve at least one time slot until said soft state reservation times out as being unused for a predetermined duration or until said soft state reservation is released by a reserving node of the multi-node communication network 100, according to an exemplary embodiment. As shown in FIG. 6, network transmissions may be organized into a plurality of repeating epochs. Each epoch may include a plurality of slots (e.g., 602, 604, 606, and/or 608). For example, the epoch may include (a) contention access slots or preconfigured transmission slots and (b) allocatable slots. A sending node that is reserving allocation of resources for transmission may determine that slots 604 and 608 are already allocated and may transmit in the slot 602 to reserve slots 606 for the sending node's transmission. For example, once the sending node is finished using the slots 606, the slots 606 may be released as unallocated slots. And then later reservation for slots 602 could time out and they become allocatable again.

Figure 7:
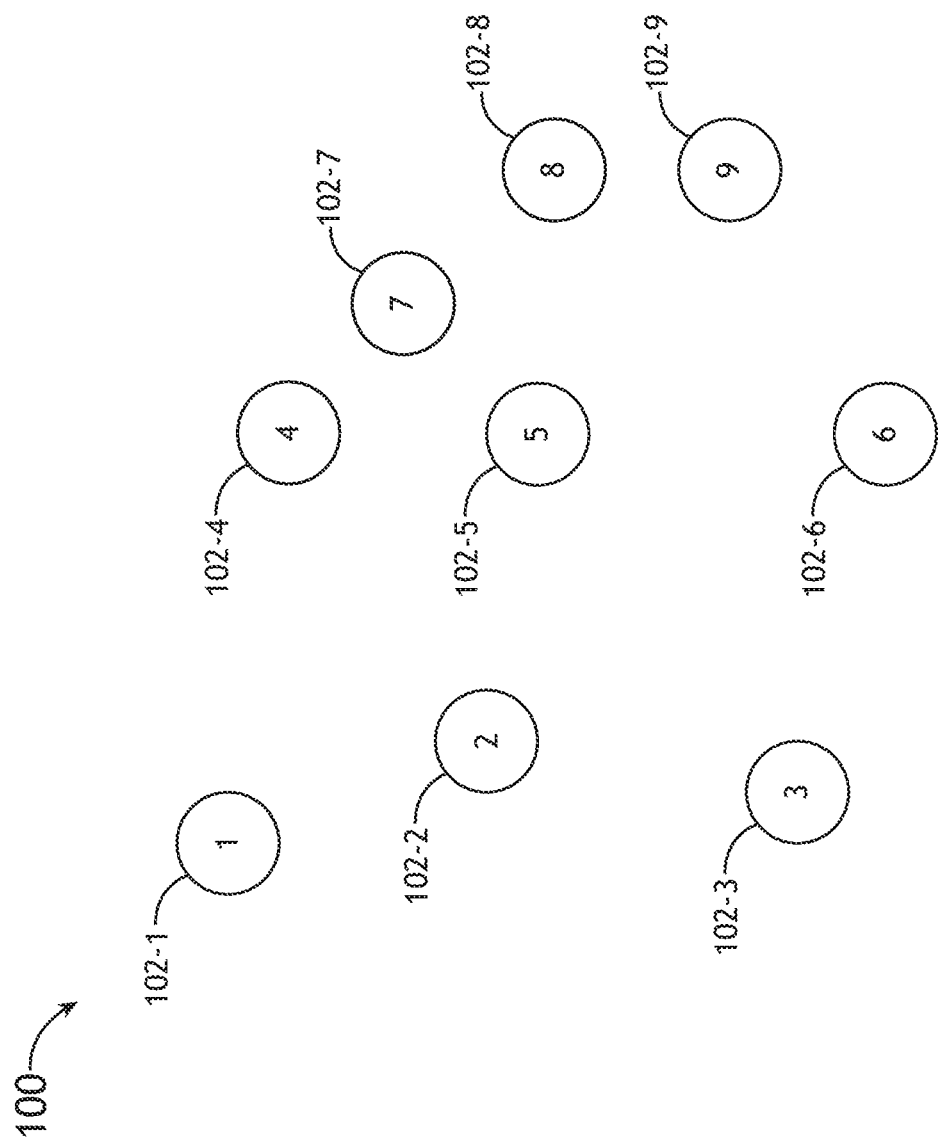
FIG. 7 illustrates an exemplary embodiment of a multi-node communication network configured to use beaconless allocation of slots to reserve transmission resources.

Referring now to FIG. 7, an exemplary embodiment is shown of a multi-node communication network 100 configured to use beaconless allocation of slots to reserve transmission resources are shown. The network 100 may be a mobile ad-hoc network (MANET) having a multiple-hop (e.g., two, three, or more hops) diameter. For example, as shown the network 100 may include a first node 102-1, a second node 102-2, a third node 102-3, a fourth node 102-4, a fifth node 102-5, a sixth node 102-6, a seventh node 102-7, an eighth node 102-8, and a ninth node 102-9 (collectively "nodes 102"). The network of FIG. 7 is associated with FIGS. 8-10 and first through sixteenth embodiments.

Figure 8:
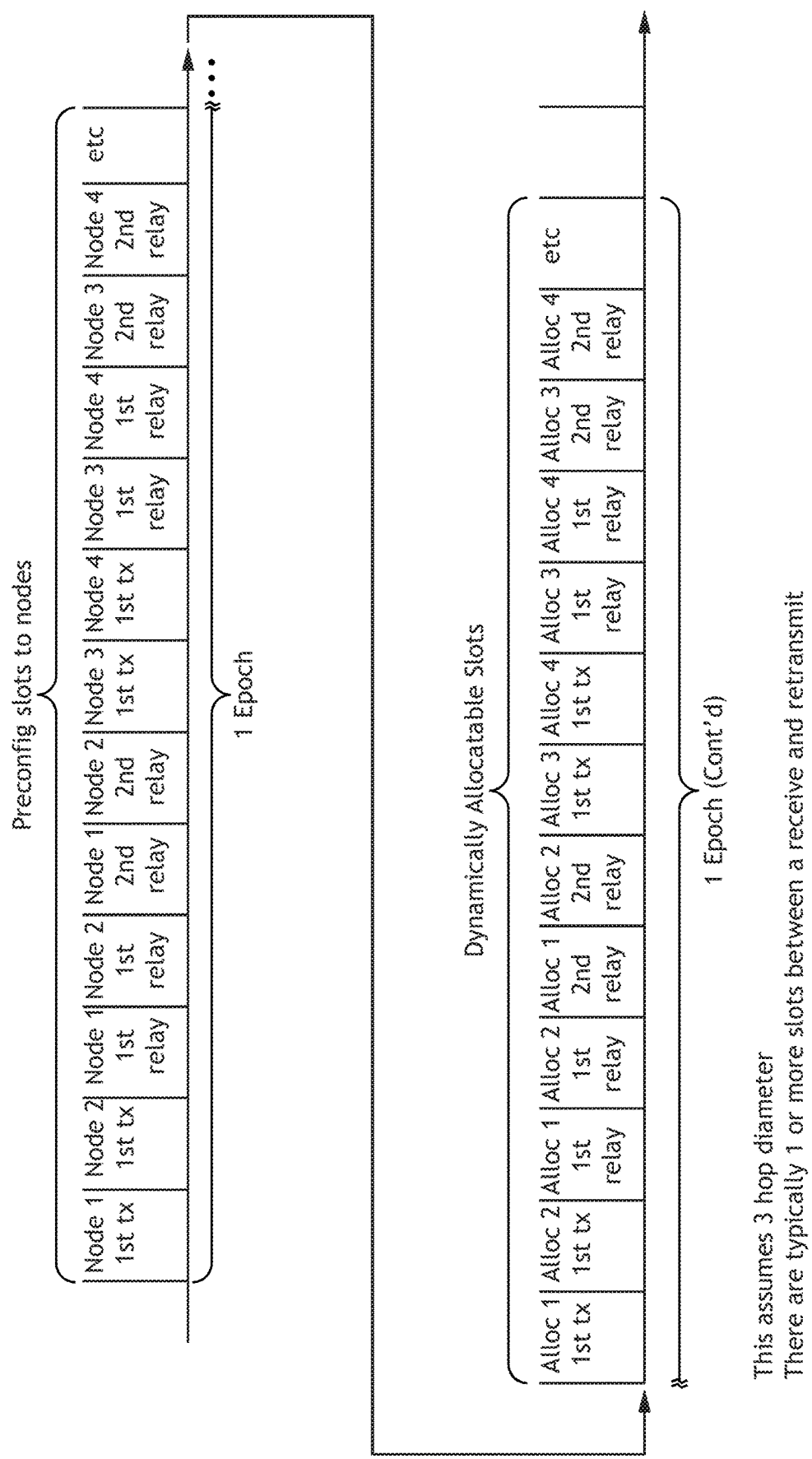
FIG. 8 illustrates an exemplary epoch of slots is shown for a first embodiment, a second embodiment, a third embodiment, and a fourth embodiment of a multi-node communication network configured to use beaconless allocation of slots to reserve transmission resources.

Referring now to FIG. 8, an exemplary epoch of slots is shown for a first embodiment, a second embodiment, a third embodiment, and a fourth embodiment of a multi-node communication network 100 configured to use beaconless allocation of slots to reserve transmission resources. This exemplary figure is associated with an exemplary 3-hop diameter network 100 where 1 or more slots may be between a receive and a retransmit.

In the first exemplary embodiment, the multi-node communication network 100 may be configured to use cooperative transmissions, preconfigured transmission slots, dynamically allocatable slots, and network-wide time synchs for the beaconless allocation of the slots to reserve the transmission resources. For example, an exemplary sequence of steps (A-K) may occur. A) The nodes 102 may power up and have a configured time slot structure as shown in FIG. 8; additionally, as this is a cooperative transmission, the relay slots may also be preconfigured for each node 102. B) The node 102-2 has traffic to transmit so the node 102-2 starts transmitting in the node's 102-2 preconfigured slot and dynamically allocates additional traffic slots for continued traffic. As none of the dynamically allocated slots are allocated, the node 102-2 selects (e.g., randomly selects) Alloc 3. Nodes 102-1, 102-3, 102-5, 102-6, and 102-7 may receive the first transmission. Node 102-4, which is in range may also receive the transmission. C) The nodes 102-1, 102-3, 102-5, 102-6, and 102-7 may retransmit what such nodes received from the node 102-2 in the node's 102-2 first relay slot, and the nodes 102-4, 102-8, and 102-9 may receive this retransmission. (Node 102-2 may optionally retransmit.) D) The nodes 102-4, 102-8, and 102-9 may receive the relayed transmission and retransmit what such nodes received from the node 102-2 in the node's 102-2 second relay slot. (The nodes 102-1, 102-3, 102-5, 102-6, and 102-7 may optionally retransmit.) There are no additional nodes left to relay the transmission to. E) The node 102-2 may continue to send traffic in the node's 102-2 preconfigured and dynamically allocatable slots, and such traffic is relayed accordingly. F) The node 102-4 has traffic to transmit, so the node 102-4 starts transmitting in the node's 102-4 preconfigured slot and dynamically allocates additional traffic slots for continued traffic by selecting (e.g., randomly selecting) Alloc 1 of the unallocated slots. The nodes 102-1, 102-2, 102-5, 102-7, 102-8, and 102-9 may receive the transmission. G) The nodes 102-1, 102-2, 102-5, 102-7, 102-8, and 102-9 may retransmit what such nodes received from the node 102-4 in the node's 102-4 first relay slot. The nodes 102-3 and 102-6 receive the retransmission. (The node 102-4 may optionally retransmit.) H) The nodes 102-3 and 102-6 may retransmit what such nodes received in the node's 102-4 second relay slot. (The nodes 102-1, 102-2, 102-3, 102-5, 102-6, and 102-7 may optionally retransmit.) There are no additional nodes left to hear the relayed transmission. I) The nodes 102-2 and 102-4 may continue to transmit traffic in the preconfigured and dynamically allocatable slots. J) Eventually the node 102-2 stops sending traffic and knows that no more traffic needs to be sent, and the node 102-2 explicitly releases (e.g., tears down) the node's 102-2 dynamic allocation so that such dynamically allocatable slots are available for other nodes to reserve. K) Eventually the node 102-4 stops sending traffic without explicitly releasing the node's 102-4 dynamic allocation. Eventually, after a predetermined duration, the node's 102-4 dynamic allocation of allocatable slots times out for lack of use are made available for other nodes to reserve.

In the second exemplary embodiment, the multi-node communication network 100 may be configured to use cooperative transmissions, preconfigured transmission slots, dynamically allocatable slots, and beaconless time synchronization for the beaconless allocation of the slots to reserve the transmission resources. The second exemplary embodiment may be configured similarly and function similarly to the first exemplary embodiment, except that: A) the node 102-2 may be a first node to transmit and does not have network time, so the node 102-2 may send a node-specific time synch information along with the node's 102-2 transmission. The other nodes may synch up with the node's 102-2 time synch. This embodiment may utilize larger time slots than the first exemplary embodiment to account for larger time error, as two-way time synch is not available. B) The node 102-4 may use the time synch information from the node 102-2 to time synch. As nodes take turns doing initial transmissions, the network 100 may adjust time synch to most recent time synch information. C) Timing out of reserved slots may take longer than the first exemplary embodiment when traffic stops flowing.

In the third exemplary embodiment, the multi-node communication network 100 may be configured to use cooperative transmissions, reconfigured static transmission slots, dynamically allocatable slots, and network-wide time synchs for the beaconless allocation of the slots to reserve the transmission resources. The third exemplary embodiment may be configured similarly and function similarly to the first exemplary embodiment, except that the nodes 102-2 and 102-4 only transmit in their respective preallocated slots (which may not time out).

In the fourth exemplary embodiment, the multi-node communication network 100 may be configured to use cooperative transmissions, preconfigured transmission slots, no dynamically allocatable slots, and beaconless time synchronization for the beaconless allocation of the slots to reserve the transmission resources. The fourth exemplary embodiment may be configured similarly and function similarly to the third exemplary embodiment, except that: A) The node 102-2 may be the first node to transmit and may not have network-wide time synch, so the node 102-2 may send time synch information with the node's 102-2 transmission. Other nodes can synch up to the node 102-2. This embodiment may utilize larger time slots than the first exemplary embodiment to account for larger time error, as two-way time synch is not available. B) The node 102-4 may use the time synch information from the node 102-2 to time synch. As nodes take turns doing initial transmissions, the network 100 may adjust time synch to most recent time synch information. C) Network time synchronization may eventually time out after traffic stops flowing.

Figure 9:
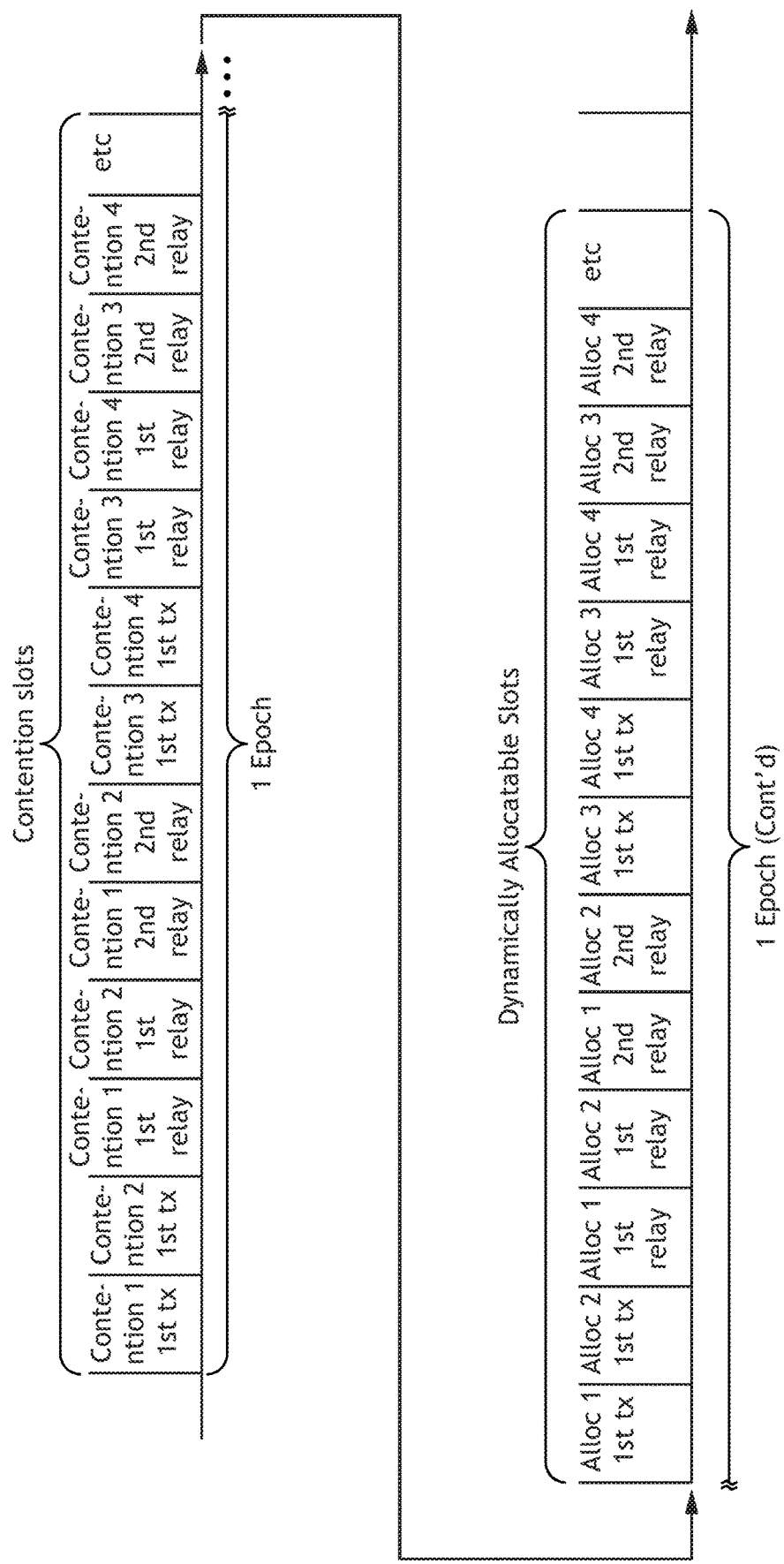
FIG. 9 illustrates an exemplary epoch of slots is shown for a fifth embodiment, a sixth embodiment, a seventh embodiment, and an eighth embodiment of a multi-node communication network configured to use beaconless allocation of slots to reserve transmission resources.

Referring now to FIG. 9, an exemplary epoch of slots is shown for a fifth embodiment, a sixth embodiment, a seventh embodiment, and an eighth embodiment of a multi-node communication network 100 configured to use beaconless allocation of slots to reserve transmission resources. This exemplary figure is associated with an exemplary 3-hop diameter network 100 from FIG. 7 where 1 or more slots may be between a receive and a retransmit.

In the fifth exemplary embodiment, the multi-node communication network 100 may be configured to use cooperative transmissions, contentions slots, dynamically allocatable slots, and network-wide time synchs for the beaconless allocation of the slots to reserve the transmission resources. The fifth exemplary embodiment may be configured similarly and function similarly to the first exemplary embodiment, except that: A) The nodes 102-2 and 102-4 do their initial transmissions in contention access slots and then may do all of their follow-on traffic only in the dynamically allocatable slots (e.g., as compared to the first exemplary embodiment where follow-on traffic may be in both preconfigured slots and dynamically allocatable slots).

In the sixth exemplary embodiment, the multi-node communication network 100 may be configured to use cooperative transmissions, contentions slots, dynamically allocatable slots, and beaconless time synchronization for the beaconless allocation of the slots to reserve the transmission resources. The sixth exemplary embodiment may be configured similarly and function similarly to the fifth exemplary embodiment, except that: A) the node 102-2 may be a first node to transmit and does not have network time, so the node 102-2 may send a node-specific time synch information along with the node's 102-2 transmission. The other nodes may synch up with the node's 102-2 time synch. This embodiment may utilize larger time slots than the fifth exemplary embodiment to account for larger time error, as two-way time synch is not available. B) The node 102-4 may use the time synch information from the node 102-2 to time synch. As nodes take turns doing initial transmissions, the network 100 may adjust time synch to most recent time synch information. C) Timing out of reserved slots may take longer than the first exemplary embodiment when traffic stops flowing.

In the seventh exemplary embodiment, the multi-node communication network 100 may be configured to use cooperative transmissions, contentions slots, no dynamically allocatable slots, and network-wide time synchs for the beaconless allocation of the slots to reserve the transmission resources. The seventh exemplary embodiment may be configured similarly and function similarly to the fifth exemplary embodiment, except that: A) the nodes 102-2 and 102-4 may only transmit in contentions slots (e.g., slotted Aloha). B) the node 102-2 may be a first node to transmit and does not have network time, so the node 102-2 may send a node-specific time synch information along with the node's 102-2 transmission. The other nodes may synch up with the node's 102-2 time synch. This embodiment may utilize larger time slots than the fifth exemplary embodiment to account for larger time error, as two-way time synch is not available. C) The node 102-4 may use the time synch information from the node 102-2 to time synch. As nodes take turns doing initial transmissions, the network 100 may adjust time synch to most recent time synch information. D) Time synch may take longer to time out compared to dynamically allocatable slots when traffic stops flowing.

In the eighth exemplary embodiment, the multi-node communication network 100 may be configured to use cooperative transmissions, contentions slots, no dynamically allocatable slots, and beaconless time synchronization for the beaconless allocation of the slots to reserve the transmission resources. The eighth exemplary embodiment may be configured similarly and function similarly to the seventh exemplary embodiment, except that: A) the node 102-2 may be a first node to transmit and does not have network time, so the node 102-2 may send a node-specific time synch information along with the node's 102-2 transmission at which point the network 100 is operating in slotted Aloha. B) The other nodes may synch up with the node's 102-2 time synch. This embodiment may utilize larger time slots than the fifth exemplary embodiment to account for larger time error, as two-way time synch is not available. C) The node 102-4 may use the time synch information from the node 102-2 to time synch. As nodes take turns doing initial transmissions, the network 100 may adjust time synch to most recent time synch information. D) Network time may eventually time out after traffic stops flowing.

Figure 10:
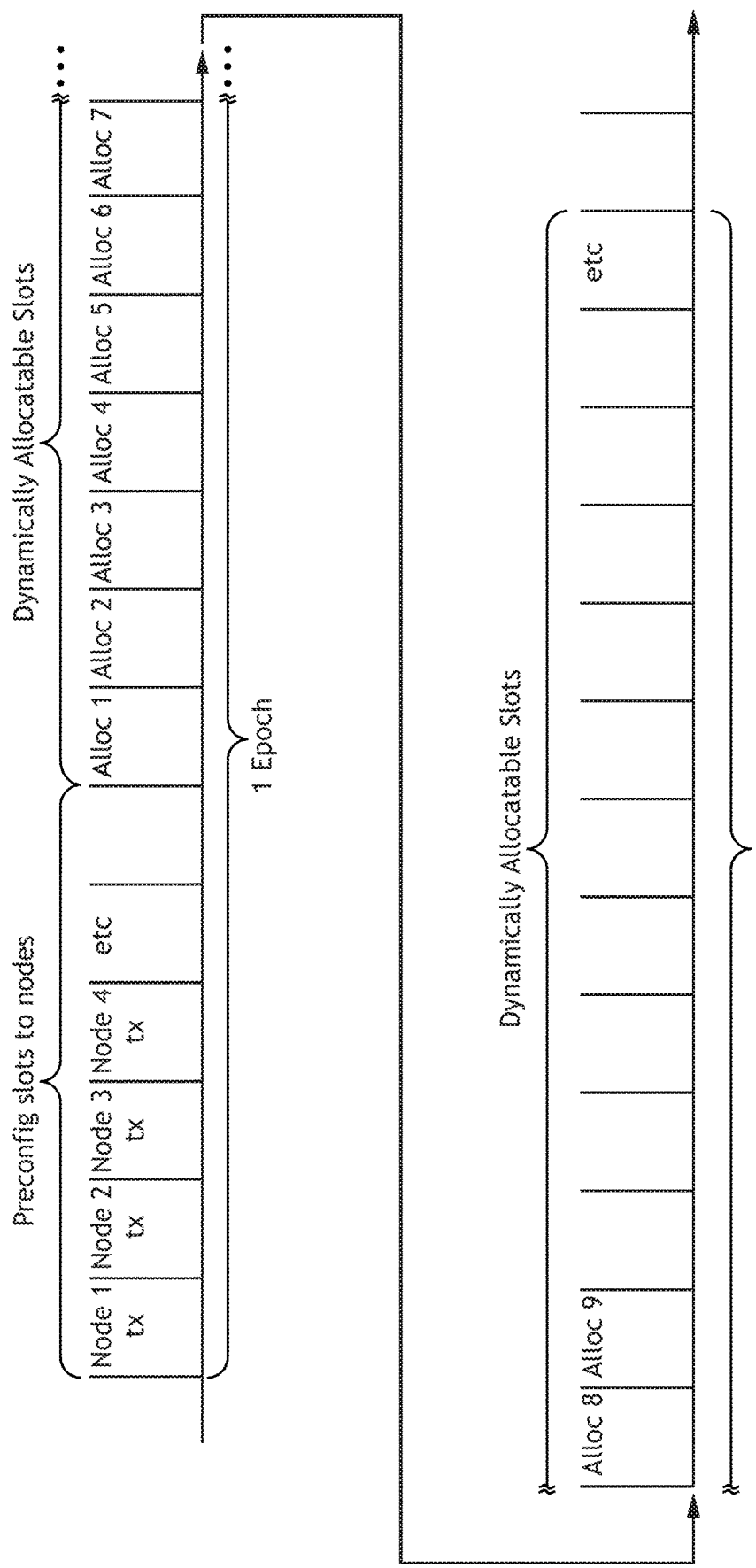
FIG. 10 illustrates an exemplary epoch of slots is shown for a ninth embodiment, a tenth embodiment, an eleventh embodiment, and a twelfth embodiment of a multi-node communication network configured to use beaconless allocation of slots to reserve transmission resources.

Referring now to FIG. 10, an exemplary epoch of slots is shown for a ninth embodiment, a tenth embodiment, an eleventh embodiment, and a twelfth embodiment of a multi-node communication network 100 configured to use beaconless allocation of slots to reserve transmission resources. This exemplary figure is associated with an exemplary 3-hop diameter network 100 where 1 or more slots may be between a receive and a retransmit.

In the ninth exemplary embodiment, the multi-node communication network 100 may be configured to use non-cooperative transmission procedures (e.g., flooding-to-routing (F2R) procedures), preconfigured transmission slots, dynamically allocatable slots, and network-wide time synchs for the beaconless allocation of the slots to reserve the transmission resources. This embodiment may include the nodes 102 powering up and having a configured time slot structure as shown in FIG. 10; since this is a single transmit transmission, only the initial transmits slots are preconfigured for each node. This embodiment may include the node 102-2 having traffic to send and transmitting an initial transmission as a flooding-to-routing transmission, and the F2R response may confirm the dynamically allocatable slots. The ninth exemplary embodiment may be configured similarly and function similarly to the first exemplary embodiment, except that the ninth exemplary embodiment uses F2R to set up allocations.

In the tenth exemplary embodiment, the multi-node communication network 100 may be configured to use non-cooperative transmission procedures (e.g., flooding-to-routing (F2R) procedures), preconfigured transmission slots, dynamically allocatable slots, and beaconless time synchronization for the beaconless allocation of the slots to reserve the transmission resources. This embodiment may include the nodes 102 powering up and having a configured time slot structure as shown in FIG. 10; since this is a single transmit transmission, only the initial transmits slots are preconfigured for each node. This embodiment may include the node 102-2 having traffic to send and transmitting an initial transmission as a flooding-to-routing transmission, and the F2R response may confirm the dynamically allocatable slots. The tenth exemplary embodiment may be configured similarly and function similarly to the second exemplary embodiment, except that the tenth exemplary embodiment uses F2R to set up allocations.

In the eleventh exemplary embodiment, the multi-node communication network 100 may be configured to use non-cooperative transmission procedures (e.g., flooding-to-routing (F2R) procedures), preconfigured static transmission slots, dynamically allocatable slots, and network-wide time synchs for the beaconless allocation of the slots to reserve the transmission resources. This embodiment may include the nodes 102 powering up and having a configured time slot structure as shown in FIG. 10; since this is a single transmit transmission, only the initial transmits slots are preconfigured for each node. This embodiment may include the node 102-2 having traffic to send and transmitting an initial transmission as a flooding-to-routing transmission, and the F2R response may confirm the dynamically allocatable slots. The eleventh exemplary embodiment may be configured similarly and function similarly to the third exemplary embodiment, except that the eleventh exemplary embodiment uses F2R to set up allocations.

In the twelfth exemplary embodiment, the multi-node communication network 100 may be configured to use non-cooperative transmission procedures (e.g., flooding-to-routing (F2R) procedures), preconfigured transmission slots, no dynamically allocatable slots, and beaconless time synchronization for the beaconless allocation of the slots to reserve the transmission resources. This embodiment may include the nodes 102 powering up and having a configured time slot structure as shown in FIG. 10; since this is a single transmit transmission, only the initial transmits slots are preconfigured for each node. This embodiment may include the node 102-2 having traffic to send and transmitting an initial transmission as a flooding-to-routing transmission, and the F2R response may confirm the dynamically allocatable slots. The twelfth exemplary embodiment may be configured similarly and function similarly to the fourth exemplary embodiment, except that the twelfth exemplary embodiment uses F2R to set up allocations.

Figure 12:
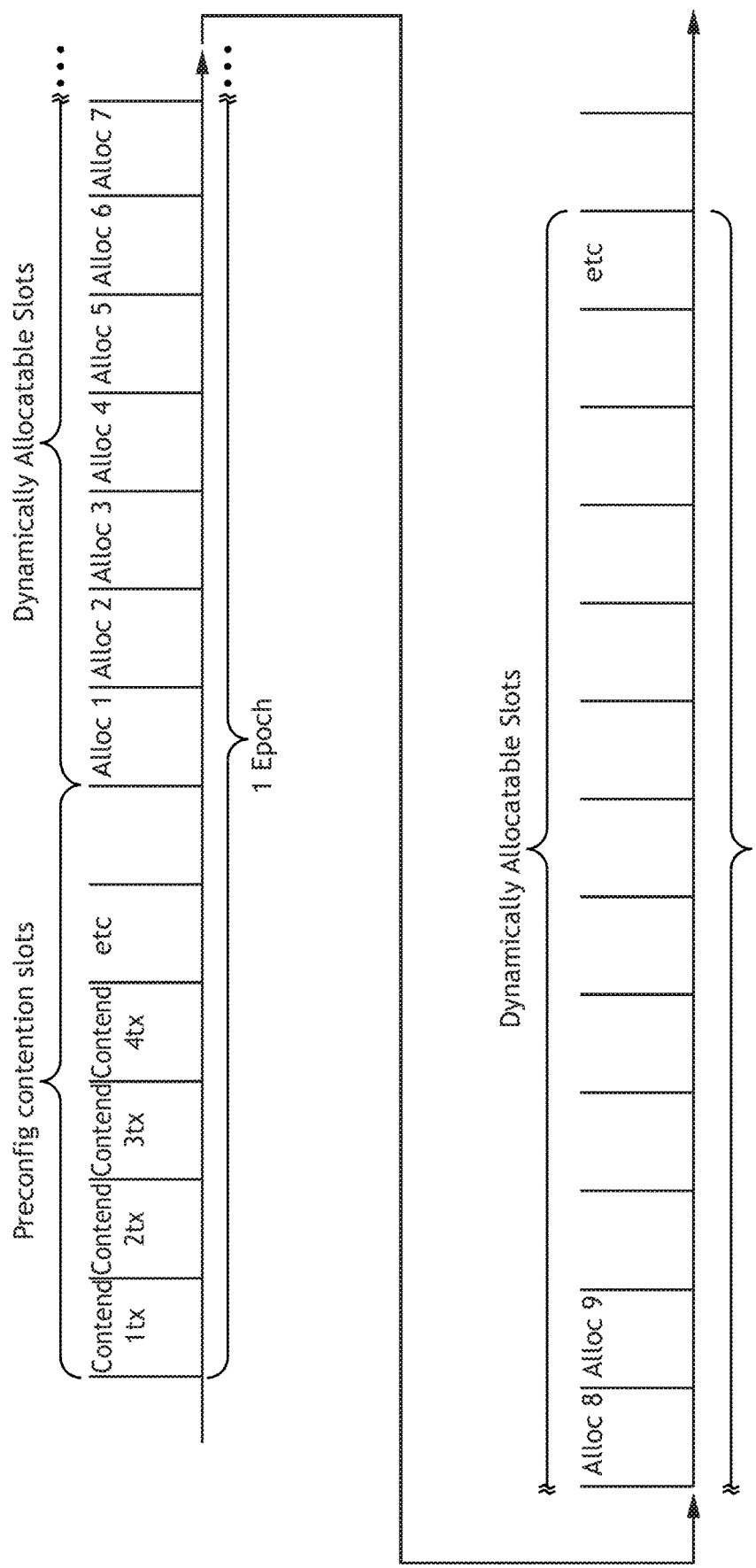
FIG. 12 illustrates an exemplary epoch of slots is shown for a thirteenth embodiment, a fourteenth embodiment, a fifteenth embodiment, and a sixteenth embodiment of a multi-node communication network.

Referring now to FIG. 12, an exemplary epoch of slots is shown for a thirteenth embodiment, a fourteenth embodiment, a fifteenth embodiment, and a sixteenth embodiment of a multi-node communication network 100 configured to use beaconless allocation of slots to reserve transmission resources. This exemplary figure is associated with an exemplary 3-hop diameter network 100 where 1 or more slots may be between a receive and a retransmit.

Figure 11:
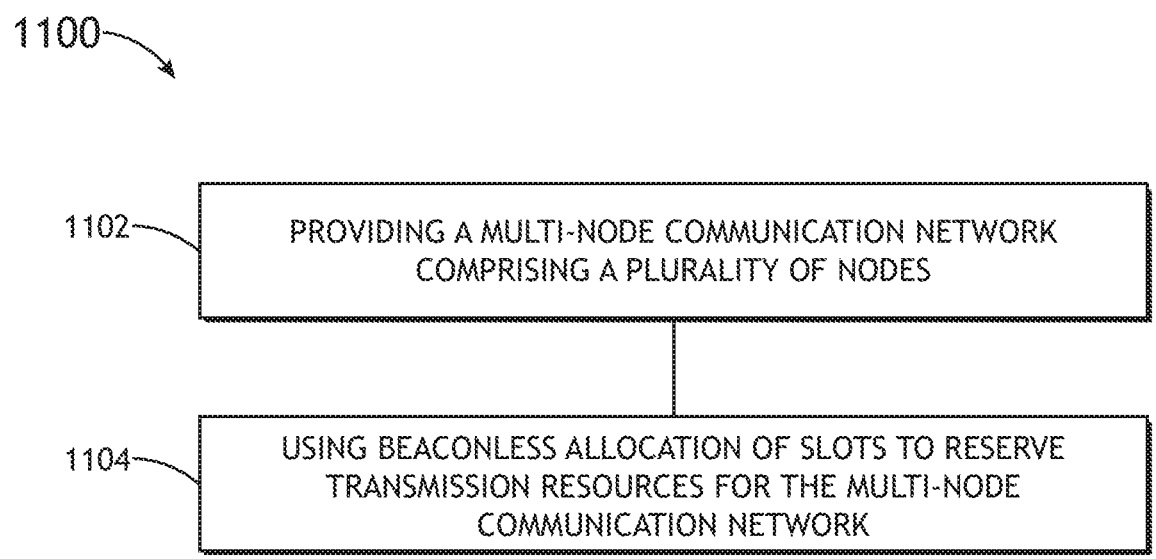
FIG. 11 illustrates a flowchart of a method, in accordance with one or more embodiments of the present disclosure.

In a thirteenth exemplary embodiment, the multi-node communication network 100 may be configured to use non-cooperative transmission procedures (e.g., flooding-to-routing (F2R) procedures), contentions slots, dynamically allocatable slots, and network-wide time synchs for the beaconless allocation of the slots to reserve the transmission resources. This embodiment may include the nodes 102 powering up and having a configured time slot structure as shown in FIG. 11; since this is a single transmit transmission, only the initial transmits slots are preconfigured for each node. This embodiment may include the node 102-2 having traffic to send and transmitting an initial transmission as a flooding-to-routing transmission, and the F2R response may confirm the dynamically allocatable slots. The thirteenth exemplary embodiment may be configured similarly and function similarly to the fifth exemplary embodiment, except that the thirteenth exemplary embodiment uses F2R to set up allocations.

In a fourteenth exemplary embodiment, the multi-node communication network 100 may be configured to use non-cooperative transmission procedures (e.g., flooding-to-routing (F2R) procedures), contentions slots, dynamically allocatable slots, and beaconless time synchronization for the beaconless allocation of the slots to reserve the transmission resources. This embodiment may include the nodes 102 powering up and having a configured time slot structure as shown in FIG. 12; since this is a single transmit transmission, only the initial transmits slots are preconfigured for each node. This embodiment may include the node 102-2 having traffic to send and transmitting an initial transmission as a flooding-to-routing transmission, and the F2R response may confirm the dynamically allocatable slots. The fourteenth exemplary embodiment may be configured similarly and function similarly to the sixth exemplary embodiment, except that the fourteenth exemplary embodiment uses F2R to set up allocations.

In a fifteenth exemplary embodiment, the multi-node communication network 100 may be configured to use non-cooperative transmission procedures (e.g., flooding-to-routing (F2R) procedures), contentions slots, no dynamically allocatable slots, and network-wide time synchs for the beaconless allocation of the slots to reserve the transmission resources. This embodiment may include the nodes 102 powering up and having a configured time slot structure as shown in FIG. 12; since this is a single transmit transmission, only the initial transmits slots are preconfigured for each node. This embodiment may include the node 102-2 having traffic to send and transmitting an initial transmission as a flooding-to-routing transmission, and the F2R response may confirm the dynamically allocatable slots. The fifteenth exemplary embodiment may be configured similarly and function similarly to the seventh exemplary embodiment, except that the fifteenth exemplary embodiment uses F2R to route traffic without any slot allocations.

In an sixteenth exemplary embodiment, the multi-node communication network 100 may be configured to use non-cooperative transmission procedures (e.g., flooding-to-routing (F2R) procedures), contentions slots, no dynamically allocatable slots, and beaconless time synchronization for the beaconless allocation of the slots to reserve the transmission resources. This embodiment may include the nodes 102 powering up and having a configured time slot structure as shown in FIG. 10; since this is a single transmit transmission, only the initial transmits slots are preconfigured for each node. This embodiment may include the node 102-2 having traffic to send and transmitting an initial transmission as a flooding-to-routing transmission, and the F2R response may confirm the dynamically allocatable slots. The sixteenth exemplary embodiment may be configured similarly and function similarly to the eighth exemplary embodiment, except that the sixteenth exemplary embodiment uses F2R to route traffic and for time synchronization.

Some embodiments may allow for on-the-fly resource reservation. In some embodiments, dedicated data forwarding may reserve additional bandwidth for future traffic. Some embodiments may use soft-state reservation and/or explicit release of release of reservations.

Some embodiments may use F2R traffic. Data forwarding may be implemented by flooding all the way to the destination, by partial flooding (e.g., multiple flooding may happen to the same data forwarding), and/or by point-to-point forwarding all the way to the destinations. Route responses may be destination initiated, intermediated node initiated, and/or a response could be flooded or partially flooded back to mitigate asymmetric links.

If two nodes originate traffic at the same time and collide on the allocatable slots or some nodes are out of range and do not hear a reservation, some embodiments may include repeating reservation information in one, some, most, or all of the traffic transmissions so that nodes can hear and know how to respond. The ability to hear conflicting reservations may vary depending on whether it is cooperative broadcast or not, whether there are allocatable slots or not, whether there are asymmetric radiofrequency (RF) link conditions, whether the nodes are correctly time synched or not, etc. To address this issue, some embodiments may include randomly not sending a transmission in a traffic flow to listen for interfering transmissions, listening for interference in a node's idle slot in a flow (e.g., for nodes in a traffic flow with preconfigured or allocatable slots), structuring the transmission modulation and coding so that interference can be detected, sending back F2R confirmation as a flood rather than routed message (e.g., to handle asymmetric links), and/or sending interference information as a one-time reservation event, etc.

Referring now to FIG. 11, an exemplary embodiment of a method 1100 according to the inventive concepts disclosed herein may include one or more of the following steps. Additionally, for example, some embodiments may include performing one or more instances of the method 1100 iteratively, concurrently, and/or sequentially. Additionally, for example, at least some of the steps of the method 1100 may be performed in parallel and/or concurrently. Additionally, in some embodiments, at least some of the steps of the method 1100 may be performed non-sequentially.

A step 1102 may include providing a multi-node communication network comprising a plurality of nodes.

A step 1104 may include using beaconless allocation of slots to reserve transmission resources for the multi-node communication network.

Further, the method 1100 may include any of the operations disclosed throughout.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A multi-node communication network, comprising:
a plurality of nodes;
wherein the multi-node communication network is configured to use beaconless allocation of slots to reserve transmission resources;
wherein the multi-node communication network is a mobile ad-hoc network (MANET) having a multiple-hop diameter;
wherein the multi-node communication network is further configured to use the beaconless allocation of the slots to reserve the transmission resources via soft state reservations; wherein each soft state reservation reserves at least one slot until said soft state reservation times out as being unused for a predetermined duration or until said soft state reservation is released by a reserving node of the multi-node communication network;
wherein the multi-node communication network is further configured to use one of cooperative transmissions or non-cooperative transmission procedures for the beaconless allocation of the slots to reserve the transmission resources; wherein the multi-node communication network is further configured to use one of preconfigured transmission slots or contentions slots for the beaconless allocation of the slots to reserve the transmission resources; wherein the multi-node communication network is further configured to use one of dynamically allocatable slots or no dynamically allocatable slots for the beaconless allocation of the slots to reserve the transmission resources; wherein the multi-node communication network is further configured to use one of network-wide time synchs or beaconless time synchronization for the beaconless allocation of the slots to reserve the transmission resources;
wherein the beaconless allocation of slots lacks any additional network control transmissions; wherein the multi-node communication network is further configured to use the cooperative transmissions for the beaconless allocation of the slots to reserve the transmission resources; wherein the multi-node communication network is further configured to use the preconfigured transmission slots for the beaconless allocation of the slots to reserve the transmission resources; wherein the multi-node communication network is further configured to use the dynamically allocatable slots for the beaconless allocation of the slots to reserve the transmission resources.

2. The multi-node communication network of claim 1, wherein the multi-node communication network is further configured to use the network-wide time synchs for the beaconless allocation of the slots to reserve the transmission resources.

3. The multi-node communication network of claim 1, wherein the multi-node communication network is further configured to use beaconless time synchronization for the beaconless allocation of the slots to reserve the transmission resources.

4. A multi-node communication network, comprising:
a plurality of nodes;

wherein the multi-node communication network is configured to use beaconless allocation of slots to reserve transmission resources;

wherein the multi-node communication network is a mobile ad-hoc network (MANET) having a multiple-hop diameter;

wherein the multi-node communication network is further configured to use the beaconless allocation of the slots to reserve the transmission resources via soft state reservations; wherein each soft state reservation reserves at least one slot until said soft state reservation times out as being unused for a predetermined duration or until said soft state reservation is released by a reserving node of the multi-node communication network;

wherein the multi-node communication network is further configured to use one of cooperative transmissions or non-cooperative transmission procedures for the beaconless allocation of the slots to reserve the transmission resources; wherein the multi-node communication network is further configured to use one of preconfigured transmission slots or contentions slots for the beaconless allocation of the slots to reserve the transmission resources; wherein the multi-node communication network is further configured to use one of dynamically allocatable slots or no dynamically allocatable slots for the beaconless allocation of the slots to reserve the transmission resources; wherein the multi-node communication network is further configured to use one of network-wide time synchs or beaconless time synchronization for the beaconless allocation of the slots to reserve the transmission resources;

wherein the beaconless allocation of slots lacks any additional network control transmissions; wherein the multi-node communication network is further configured to use the cooperative transmissions for the beaconless allocation of the slots to reserve the transmission resources; wherein the multi-node communication network is further configured to use the contentions slots for the beaconless allocation of the slots to reserve the transmission resources.

5. The multi-node communication network of claim 4, wherein the multi-node communication network is further configured to use the dynamically allocatable slots for the beaconless allocation of the slots to reserve the transmission resources; wherein the multi-node communication network is further configured to use the network-wide time synchs for the beaconless allocation of the slots to reserve the transmission resources.

6. The multi-node communication network of claim 4, wherein the multi-node communication network is further configured to use the dynamically allocatable slots for the beaconless allocation of the slots to reserve the transmission resources; wherein the multi-node communication network is further configured to use beaconless time synchronization for the beaconless allocation of the slots to reserve the transmission resources.

7. The multi-node communication network of claim 4, wherein the multi-node communication network is further configured to use no dynamically allocatable slots for the beaconless allocation of the slots to reserve the transmission resources; wherein the multi-node communication network is further configured to use the network-wide time synchs for the beaconless allocation of the slots to reserve the transmission resources.

8. The multi-node communication network of claim 4, wherein the multi-node communication network is further configured to use no dynamically allocatable slots for the beaconless allocation of the slots to reserve the transmission resources; wherein the multi-node communication network is further configured to use beaconless time synchronization for the beaconless allocation of the slots to reserve the transmission resources.

* * * * *